United States Patent [19]

Okada

[11] Patent Number: 5,879,822
[45] Date of Patent: Mar. 9, 1999

[54] MAGNETO-OPTICAL RECORDING MEDIUM USING IN-PLANE MAGNETIZATION FILM AND CAPABLE OF REPRODUCING AT SUPER-HIGH RESOLUTION AND METHOD OF REPRODUCING FOR SUCH MEDIUM

[75] Inventor: Takeshi Okada, Yokohama, Japan

[73] Assignee: Canon Kabushiki Kaisha, Tokyo, Japan

[21] Appl. No.: 695,942

[22] Filed: Aug. 12, 1996

[30] Foreign Application Priority Data

Aug. 15, 1995 [JP] Japan ..................................... 7-208184

[51] Int. Cl.$^6$ ................................ G11B 3/70; G11B 5/64; G11B 5/66
[52] U.S. Cl. .......................... 428/694 RE; 428/694 MM; 428/694 EC; 369/13; 369/288
[58] Field of Search .............................. 369/13, 283, 288, 369/286; 428/64.3, 694 ML, 694 SC, 694 LE, 694 MT, 694 RE, 694 MM, 694 EC

[56] References Cited

U.S. PATENT DOCUMENTS 5,563,852 10/1996 Murakami et al. ....................... 369/13

FOREIGN PATENT DOCUMENTS

| 492553 | 7/1992 | European Pat. Off. . |
| 586122 | 3/1994 | European Pat. Off. . |
| 586122 A1 | 3/1994 | European Pat. Off. . |
| 586175 | 3/1994 | European Pat. Off. . |
| 619577 A1 | 10/1994 | European Pat. Off. . |
| 668586 A2 | 8/1995 | European Pat. Off. . |
| 673026 A2 | 9/1995 | European Pat. Off. . |
| 686970 A2 | 12/1995 | European Pat. Off. . |
| 810594 A2 | 12/1997 | European Pat. Off. . |
| 62-175948 | 8/1987 | Japan . |
| 3-93056 | 4/1991 | Japan . |
| 3-93058 | 4/1991 | Japan . |
| 4-255946 | 9/1992 | Japan . |
| 6-124500 | 5/1994 | Japan . |

OTHER PUBLICATIONS

N. Nishimura, et al., "MSR Disks with Three Magnetic Layers Using In–Plane Magnetization Films", Journal of Magnetics Society of Japan, vol. 19, No. Suppl. S1., pp. 417–420, Sep. 27–29, 1994.

Tadashi Kobayashi, "The Study About Magnetism and Magnetoopic Effect of Rare Earth–iron Group Amorphous Alloy Thin Film and its Compound Film", doctoral thesis of Nagoya University, pp. 40–41, Mar. 1993.

*Primary Examiner*—John J. Zimmerman
*Assistant Examiner*—Michael LaVilla
*Attorney, Agent, or Firm*—Fitzpatrick, Cella, Harper & Scinto

[57] ABSTRACT

A magneto-optical recording medium is constructed by a reproduction layer which assumes an in-plane magnetization state at room temperature and becomes a perpendicular magnetization film at temperatures between room temperature and a Curie temperature, a recording layer for storing information, and an intermediate layer which is arranged between the reproduction layer and the recording layer and in which a Curie temperature is lower than those of the reproduction layer and the recording layer and which is iron group element sub-lattice magnetization dominant. Each of the layers is constructed by a rare earth-iron group element amorphous alloy and the intermediate layer is made of a material, as a main component, which satisfies $[Gd_x(Fe_{100-y}Co_y)_{100-x}]$ ($8 \leq x \leq 15$, $0 \leq y \leq 50$). The reproduction layer has a compensation temperature between room temperature and the Curie temperature.

2 Claims, 12 Drawing Sheets

FIG. 4
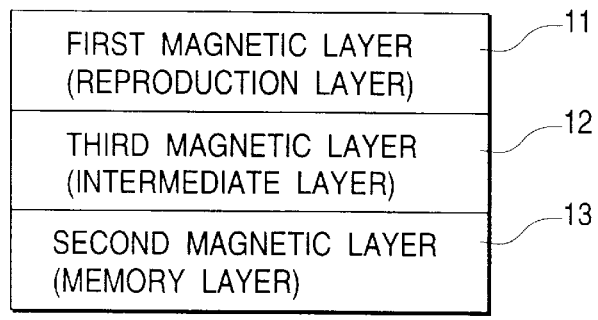
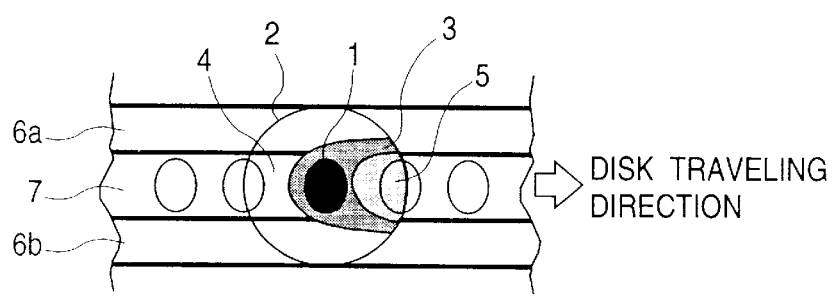
FIG. 5A
FIG. 5B
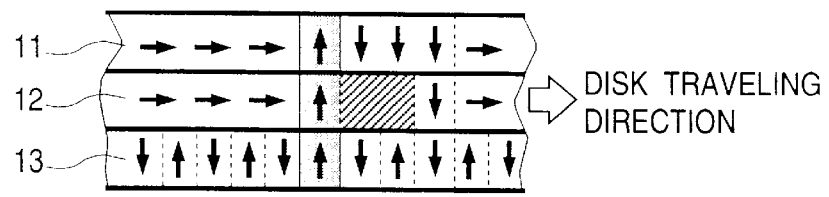
FIG. 5C
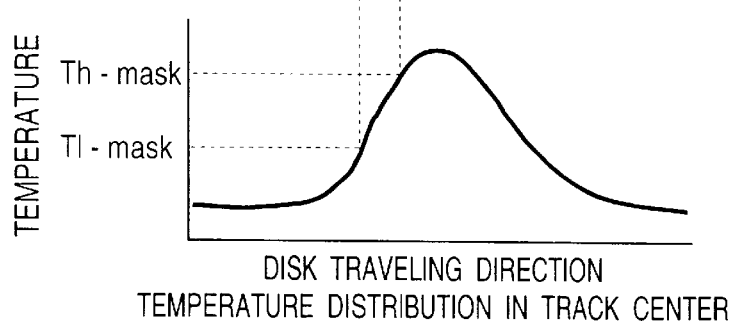
DISK TRAVELING DIRECTION
TEMPERATURE DISTRIBUTION IN TRACK CENTER COMPOSITION DEPENDENCY OF Ms IN $Gd_p(Fe_{100-q}Co_q)_{100-p}$ COMPOSITION DEPENDENCY OF CURIE TEMPERATURE IN $Gd_p(Fe_{100-q}Co_q)_{100-p}$ Gd CONTENT vs Tc, TcomP $Gd_p(Fe_{100-q}Co_q)_{100-p}$

5,879,822

MAGNETO-OPTICAL RECORDING MEDIUM USING IN-PLANE MAGNETIZATION FILM AND CAPABLE OF REPRODUCING AT SUPER-HIGH RESOLUTION AND METHOD OF REPRODUCING FOR SUCH MEDIUM

BACKGROUND OF THE INVENTION

1. Field of the Invention

The invention relates to a magneto-optical recording medium for recording and reproducing information by a laser beam by using a magnetooptic effect and, more particularly, to a magneto-optical recording medium for enabling a high density of a medium to be realized and to an information reproducing method for such a medium.

2. Related Background Art

As a rewritable high density recording system, attention is paid to a magneto-optical recording medium such that information is recorded by writing magnetic domains to a thin magnetic film by using thermal energy of a semiconductor laser. Information is read out by detecting a change in Kerr rotational angle of a reflected light from the medium. In recent years, a demand to raise a recording density of the magneto-optical recording medium and to realize a recording medium of a further large capacity has increased.

The linear recording density of an optical disk such as a magneto-optical recording medium or the like largely depends on a laser wavelength λ of a reproducing optical system and a numerical aperture NA of an objective lens. Namely, when the reproduction light wavelength and the numerical aperture of the objective lens are determined, a diameter of beam west is decided, so that a value of about λ/2NA as the shortest mark length is the limit which can be reproduced. On the other hand, the track density is mainly limited by crosstalks between the adjacent tracks and depends on a spot diameter of reproducing beam in a manner similar to the shortest mark length. Therefore, to realize a high density in a conventional optical disk, it is necessary to reduce the laser wavelength of the reproducing optical system or increase the numerical aperture NA of the objective lens. However, it is difficult to reduce the wavelength of laser because of problems of efficiency, heat generation, and the like of devices. When the numerical aperture of the objective lens is increased, not only is it difficult to work the lens but also a distance between the lens and the disk becomes too short that a mechanical problem such that the lens collides with the disk or the like occurs. To prevent such a problem, a technique for improving the recording density by devising a structure of the recording medium or a reading method has been developed.

A magnetooptic reproducing method disclosed in Japanese Patent Application Laid-Open No. 3-93056 will now be described with reference to FIG. 1. FIG. 1 is a diagram for explaining an example of a conventional super-high resolution technique. The top diagram is a schematic cross sectional view showing a magnetization state of each layer of an optical disk. The middle diagram is a schematic plan view showing a mask region and an aperture region in a light spot on a plate surface of a medium. The bottom diagram is a graph showing a temperature distribution in a track direction of a corresponding portion. As shown in the diagrams, a substrate 20 is ordinarily made of a transparent material such as glass or polycarbonate. An interference layer 34, a reproduction layer 31, an intermediate layer 32, a memory layer 33, and a protective layer 35 are sequentially laminated on the substrate 20 in accordance with this order. The interference layer 34 is used to raise a Kerr effect. The protective layer 35 is used to protect a magnetic layer. An arrow in the magnetic layer indicates a direction of a magnetization or an atom magnetic moment in the film. A light spot 2 is irradiated to the medium with such a construction. A magnetic coupling of the reproduction layer 31 and memory layer 33 of a high temperature portion in a temperature distribution of the medium which occurs in this instance is cut off by the intermediate layer 32 of a low Curie temperature. The magnetization of the reproduction layer 31 of the portion in which the magnetic coupling has been cut off is aligned in one direction by an external magnetic field (reproduction magnetic field 22 in the diagram), thereby forming a rear mask 5 for partially masking the magnetic domain information of the memory layer 33 in the light spot 2. As mentioned above, an aperture 3 and the rear mask 5 corresponding to a recording mark 1 as shown in the diagram are formed in the light spot 2 on a land 7 between grooves 6a and 6b as mentioned above, thereby enabling a signal (recording mark 1) of a period that is equal to or less than a diffraction limit of the light to be reproduced and trying to improve a linear recording density.

According to super-high resolution reproducing methods disclosed in Japanese Patent Application Laid-Open Nos. 3-93058 and 4-255946, as shown in FIG. 2, by using a medium having the reproduction layer 31, intermediate layer 32, and memory layer 33, the direction of the magnetization of the reproduction layer 31 is aligned to one direction by an initialization magnetic field 21 prior to reproducing information, and the magnetic domain information of the memory layer 33 is masked. After that, the light spot 2 is irradiated. In a low temperature region in a temperature distribution of the medium which is caused in this instance, the reproduction layer 31 is allowed to maintain an initialization state (a front mask 4 is formed). In a high temperature region that is equal to or higher than a Curie temperature Tc2 of the intermediate layer 32, the reproduction layer 31 is forcedly oriented (the rear mask 5 is formed) in the direction of the reproduction magnetic field 22. In only a middle temperature region, the magnetic domain information of the memory layer 33 is transferred, thereby reducing an effective size of the reproducing spot. Thus, the recording mark 1 of the diffraction limit of the light or less is enabled to be reproduced, thereby improving the linear density.

According to a magneto-optical recording medium disclosed in Japanese Patent Application Laid-Open No. 6-124500, as a super-high resolution technique to realize a recording density that is equal to or higher than an optical resolution of the reproducing light, a medium having an interference layer 43, a reproduction layer 41, a memory layer 42, and a protective layer 44 as shown in FIG. 3 has been proposed. An arrow in a magnetic film in the diagram indicates a direction of a sub-lattice magnetization of an iron group element in the film. By "iron group" is here meant the elements iron, cobalt, and nickel. The memory layer 42 is a film such as TbFeCo, DyFeCo, or the like having a large perpendicular magnetic anisotropy. Recording information forms a magnetic domain depending on whether the magnetic domain of such a layer is upward or downward for the film surface and holds such a magnetic domain. Although the reproduction layer 41 is an in-plane magnetization film at room temperature, when a temperature rises, the reproduction layer 41 becomes a perpendicular magnetization film. When a light for reproducing information is irradiated to the medium with such a structure from the substrate 20 side, a temperature gradient at the center of a data track becomes as shown in FIG. 3. In accordance with such a temperature gradient, a low temperature region in which the reproduction layer 41 is held as an in-plane magnetization film and a high temperature region in which it becomes a perpendicular magnetization film are formed. An isothermal line of a temperature (Tl-mask) at a boundary of both of the low and high temperature regions exists as shown in FIG. 3. In the low temperature region of Tl-mask or lower, since the reproduction layer 41 becomes the in-plane magnetization film, it doesn't contribute to an extra-Kerr effect (the front mask 4 is formed) and a recording magnetic domain held in the memory layer 42 is masked and cannot be seen. On the other hand, in a temperature region of Tl-mask or higher, the reproduction layer 41 becomes the perpendicular magnetization film and the direction of the magnetization is set to the same direction as that of the recording information by the exchange coupling from the memory layer 42. Thus, since the recording magnetic domain of the memory layer 42 is transferred to only the portion of the aperture 3 smaller than the size of light spot 2, a super-high resolution is realized.

According to those well-known super-high resolution methods, since the front mask 4 in the low temperature region extends in the direction of the adjacent track, not only the linear recording density but also the track density are improved.

According to the method (FIG. 1) disclosed in Japanese Patent Application Laid-Open No. 3-93056, although the resolution can be raised without deteriorating a signal quality, it is necessary to apply a reproduction magnetic field 22. Further, according to the methods (FIG. 2) disclosed in Japanese Patent Application Laid-Open Nos. 3-93058 and 4-255946, prior to reproducing information, a magnet for initializing magnetic field 21 to align the magnetization of the reproduction layer 31 to one direction also needs to be added to the apparatus. According to the super-high resolution reproducing method (FIG. 3) disclosed in Japanese Patent Application Laid-Open No. 6-124500, since only the front mask 4 is used, there is a problem such that when the region of the mask is widened to raise the resolution, the position of the aperture 3 is deviated from the spot center, so that a signal quality deteriorates or the like.

As mentioned above, the conventional super-high resolution reproducing methods have problems such that the resolution cannot be sufficiently raised, the magnetooptic recording and reproducing apparatus becomes complicated, the costs are high, it is difficult to miniaturize, and the like.

SUMMARY OF THE INVENTION

It is an object of the invention to solve the problems of the conventional techniques as mentioned above, and to provide a magneto-optical recording medium capable of reproducing a recording mark of a diffraction limit of the light or less at a high signal quality with a simple construction such that an initializing magnetic field and a reproducing magnetic field are not needed upon reproduction, and also to provide an information reproducing method for such a medium.

The above object is accomplished by a magneto-optical recording medium comprising:
a reproduction layer which assumes an in-plane magnetization state at room temperature and becomes a perpendicular magnetization film at a temperature between room temperature and a Curie temperature;
a recording layer for storing information; and
an intermediate layer which is arranged between the reproduction layer and the recording layer and whose Curie temperature is lower than those of the reproduction layer and recording layer and which is iron group element sub-lattice magnetization dominant, wherein each of the layers is made of a rare earth-iron group element amorphous alloy and the intermediate layer is made of a material, as a main component, which satisfies

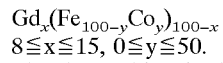

$8 \leq x \leq 15, 0 \leq y \leq 50$.

The above object is also accomplished by an information reproducing method of reproducing information by irradiating a laser spot to a magneto-optical recording medium comprising:
a reproduction layer which assumes an in-plane magnetization state at room temperature and becomes a perpendicular magnetization film at a temperature between room temperature and a Curie temperature;
a recording layer for storing information; and
an intermediate layer which is arranged between the reproduction layer and the recording layer and whose Curie temperature is lower than those of the reproduction layer and recording layer and which is iron group element sub-lattice magnetization dominant, in which each of the layers is made of a rare earth-iron group element amorphous alloy and the intermediate layer is made of a material, as a main component, which satisfies

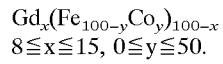

$8 \leq x \leq 15, 0 \leq y \leq 50$.

wherein the method comprises the steps of:
causing the magnetization of the reproduction layer to assume an in-plane magnetization state in a low temperature portion in the spot, causing the magnetization of each of the reproduction layer and intermediate layer to become a perpendicular magnetization state in an intermediate temperature portion in the spot, transferring information stored in the recording layer to the reproduction layer by an exchange coupling force, further raising a temperature of the intermediate layer in a high temperature portion in the spot to a Curie temperature or higher, and orienting the magnetization of the reproduction layer in a predetermined direction by an influence of a magnetostatic coupling force from the recording layer; and
a step of detecting a change in Kerr rotational angle of the reflected light from the medium and reproducing the information.

The above and other objects and features of the present invention will become apparent from the following detailed description and the appended claims with reference to the accompanying drawings.

BRIEF DESCRIPTION OF THE DRAWINGS

FIG. 4 is a schematic cross sectional view showing a fundamental layer structure of a magnetic layer of a magneto-optical recording medium of the present invention;

FIGS. 5A to 5C are diagrams for explaining an information reproducing method of the magneto-optical recording medium of the invention;

FIG. 5A is a schematic diagram showing a mask region, an aperture region, and the like in a spot on a plate surface of the medium;

FIG. 5B is a schematic cross sectional view showing a magnetization direction state of each layer;

FIG. 5C is a graph showing a temperature distribution of a corresponding portion;

FIG. 10A is a schematic diagram regarding a layer structure of an anti-parallel type;

FIG. 10B is a schematic diagram regarding a layer structure of a parallel type;

FIG. 13A shows a diagram in case of a composition in which a rare earth-sub-lattice magnetization is dominant, FIGS. 13B, 13C and 13D respectively show diagrams of cases of compositions in each of which an iron group sub-lattice magnetization is dominant;

DETAILED DESCRIPTION OF THE PREFERRED EMBODIMENTS

Figure 1:
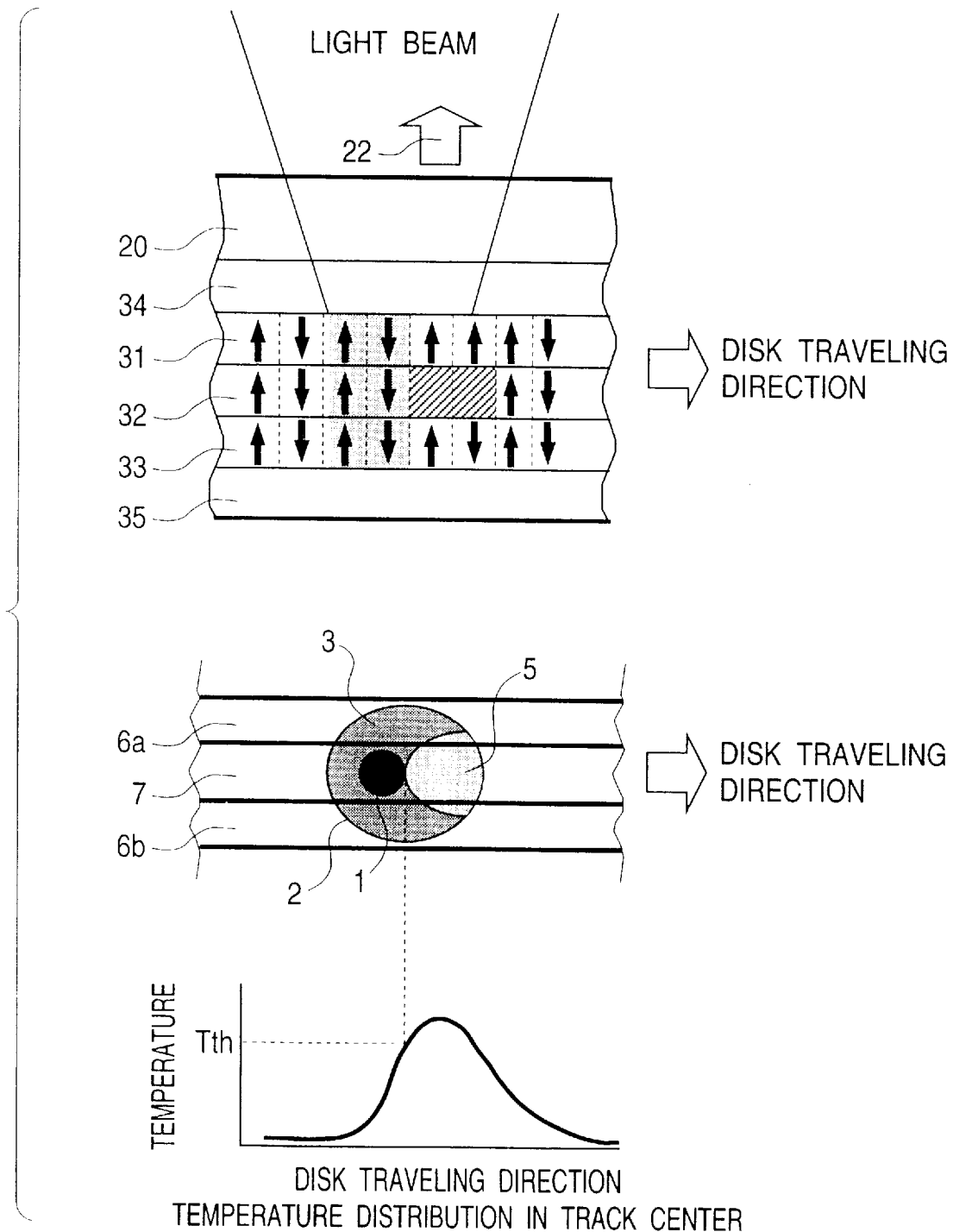
FIG. 1 is a schematic diagram showing an example of a super-high resolution technique of a conventional magneto-optical recording medium.
Figure 2:
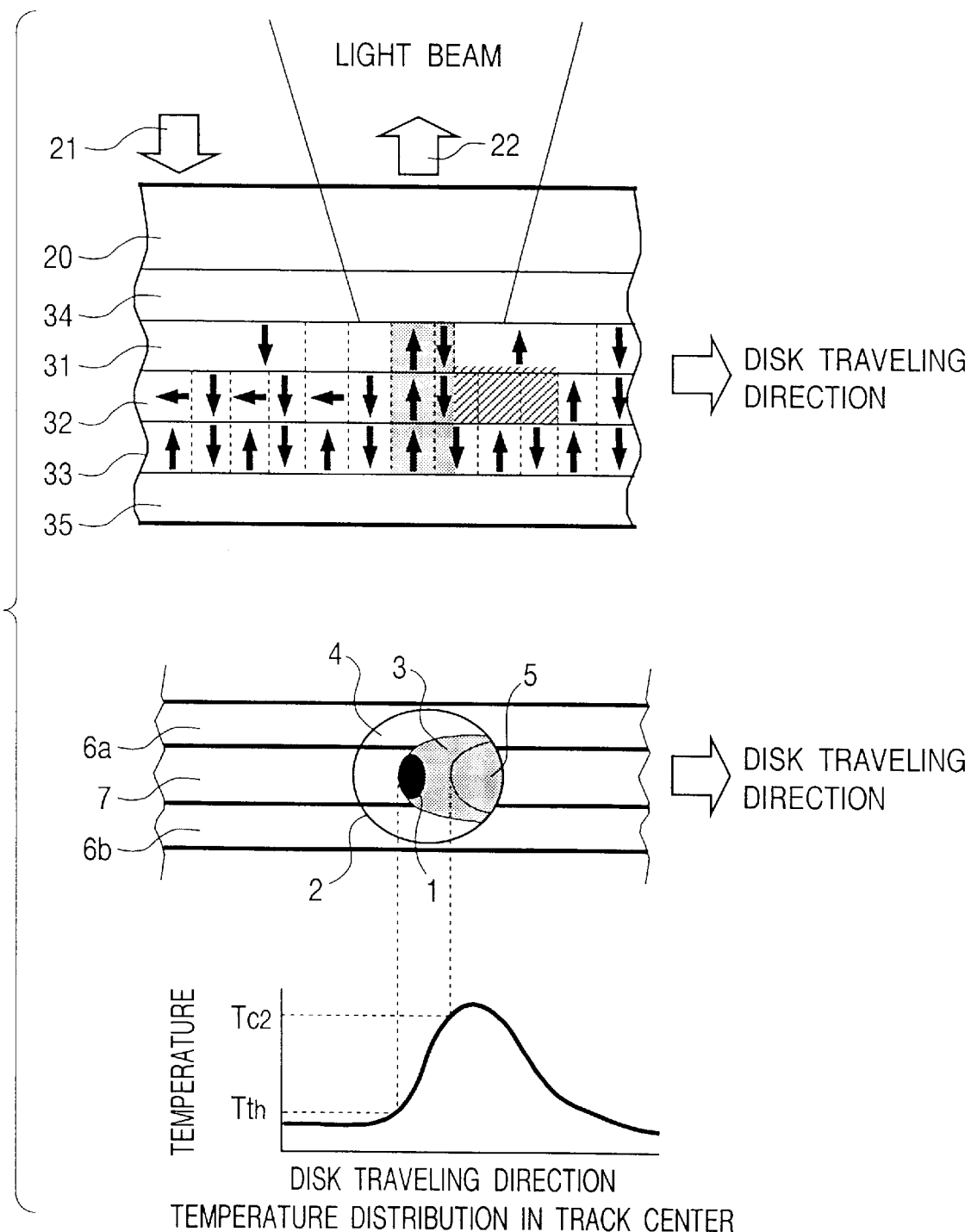
FIG. 2 is a schematic diagram showing another example of the super-high resolution technique of the conventional magneto-optical recording medium.
Figure 3:
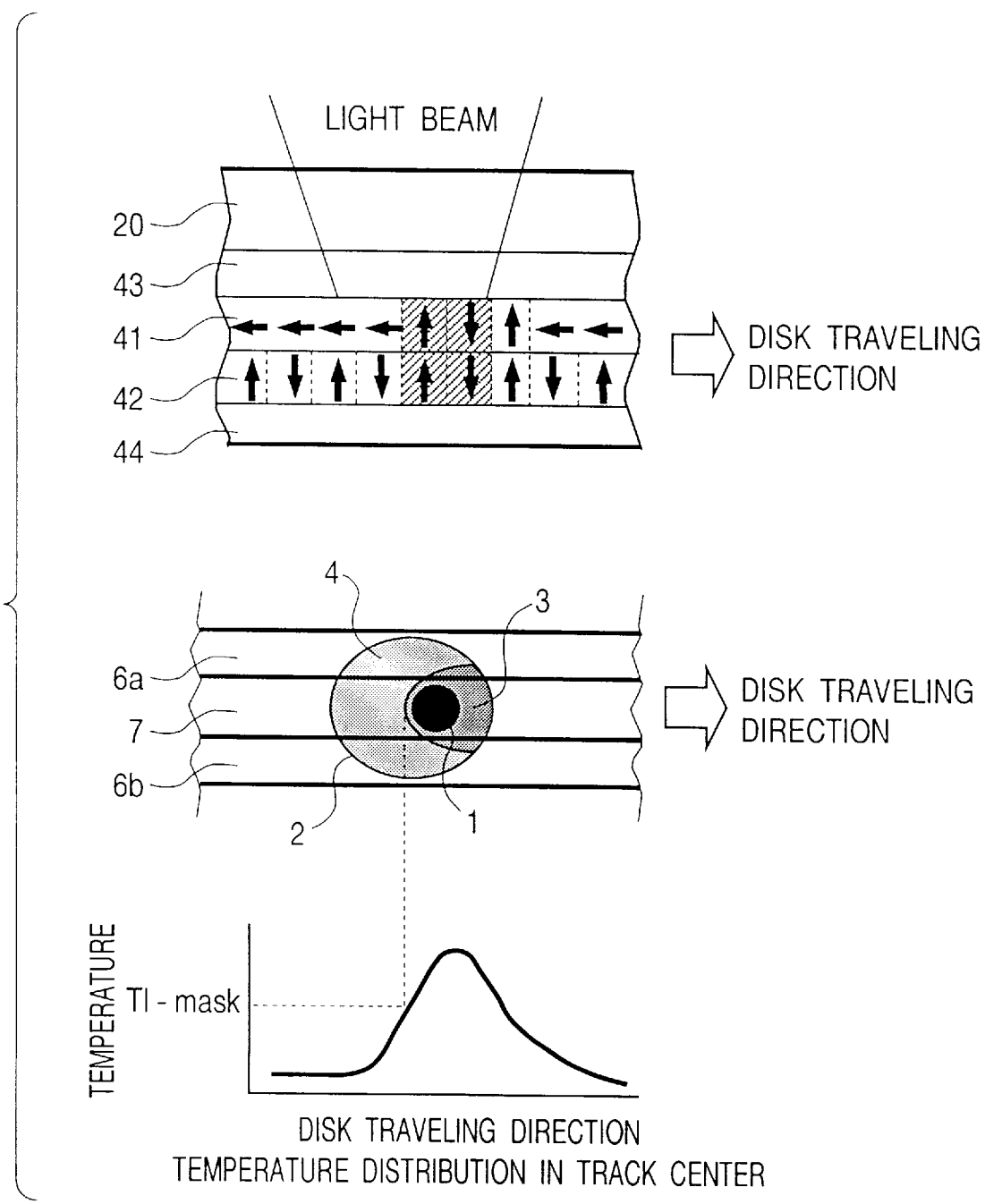
FIG. 3 is a schematic diagram showing still another example of the super-high resolution technique of the conventional magneto-optical recording medium.

A magneto-optical recording medium and an information reproducing method of the present invention will now be described in detail hereinbelow.

FIG. 4 is a diagram showing a fundamental layer structure of a magnetic layer of a magneto-optical recording medium of the invention. As shown in the diagram, the magneto-optical recording medium of the invention has at least three magnetic layers comprising: a first magnetic layer 11 which assumes an in-plane magnetization film at room temperature and becomes a perpendicular magnetization film at a temperature between room temperature and a Curie temperature; a third magnetic layer 12 which assumes an in-plane magnetization film at room temperature and has a Curie temperature lower than Curie temperatures of the first magnetic layer 11 and a second magnetic layer 13; and the second magnetic layer 13 which has a coercive force larger than that of the first magnetic layer 11 and a Curie temperature lower than that of the first magnetic layer 11 and is formed by a perpendicular magnetization film in which recording information is stored. In accordance with a function of each layer, the first, second, and third magnetic layers are sequentially referred to as reproduction layer, memory layer, and intermediate layer hereinbelow.

The reproduction layer 11 is a layer for reproducing magnetization information held in the memory layer 13. Generally, the reproduction layer 11 is located on the side near a light incidence as compared with the positions of the intermediate layer 12 and memory layer 13 and the Curie temperature is set to be higher than those of the intermediate layer 12 and memory layer 13 so as not to deteriorate a Kerr rotational angle upon reproduction. It is necessary to set the coercive force of the reproduction layer 11 to be smaller than that of the memory layer 13. It is preferable to use a reproduction layer such that a magnetic anisotropy is small, it assumes an in-plane magnetization film at room temperature, it becomes a perpendicular magnetization film at a temperature between room temperature and the Curie temperature, and a compensation temperature exists between room temperature and the Curie temperature. As a material of the reproduction layer 11, for example, a rare earth-iron group amorphous alloy is preferable. Specifically speaking, a material containing GdFeCo, as a main component, such as GdFeCo, GdTbFeCo, GdDyFeCo, NbGdFeCo, etc. is preferable because a Curie temperature is high, a coercive force is low, a contraction of a recording magnetic domain easily occurs in a high temperature region, so that the inversion of the recording magnetic domain of the first magnetic layer easily occurs, a Kerr rotational angle of the first magnetic layer is large, and a signal quality at, particularly, a portion of a short mark length is improved.

The intermediate layer 12 assumes an in-plane magnetization film at room temperature and becomes a perpendicular magnetization film at a temperature between room temperature and the Curie temperature. The intermediate layer 12 is a layer provided for a purpose of mainly partially intervening and partially reducing or cutting off the exchange coupling force from the memory layer 13 to the reproduction layer 11. Therefore, the intermediate layer 12 is located between the reproduction layer 11 and memory layer 13 and the Curie temperature is set to be higher than room temperature and is set to be lower than the Curie temperatures of the reproduction layer 11 and memory layer 13. The Curie temperature of the intermediate layer 12 is set to a high temperature such that the exchange coupling force from the memory layer 13 can be intervened to the reproduction layer 11 in a middle temperature region and a high temperature region in the spot and is set to a low temperature such that the exchange coupling force can be cut out in the highest temperature portion. Specifically speaking, it is preferable to set to a temperature within a range between 80° C. or more and 220° C. or less. More preferably, the Curie temperature is set to a value within a range between 110° C. or more and 180° C. or less. As a material of the intermediate layer 12, for example, a rare earth-iron group amorphous alloy, specifically speaking, GdFe, GdFeCo, GdTbFeCo, GdDyFeCo, or the like is desirable. In order to enhance the in-plane magnetic anisotropy of the reproduction layer 11 at a low temperature, a material whose in-plane anisotropy at room temperature is larger than that of the reproduction layer 11, for example, a layer in which a saturation magnetization Ms at room temperature is larger than that at room temperature of the reproduction layer 11 is more preferable.

Figure 11:
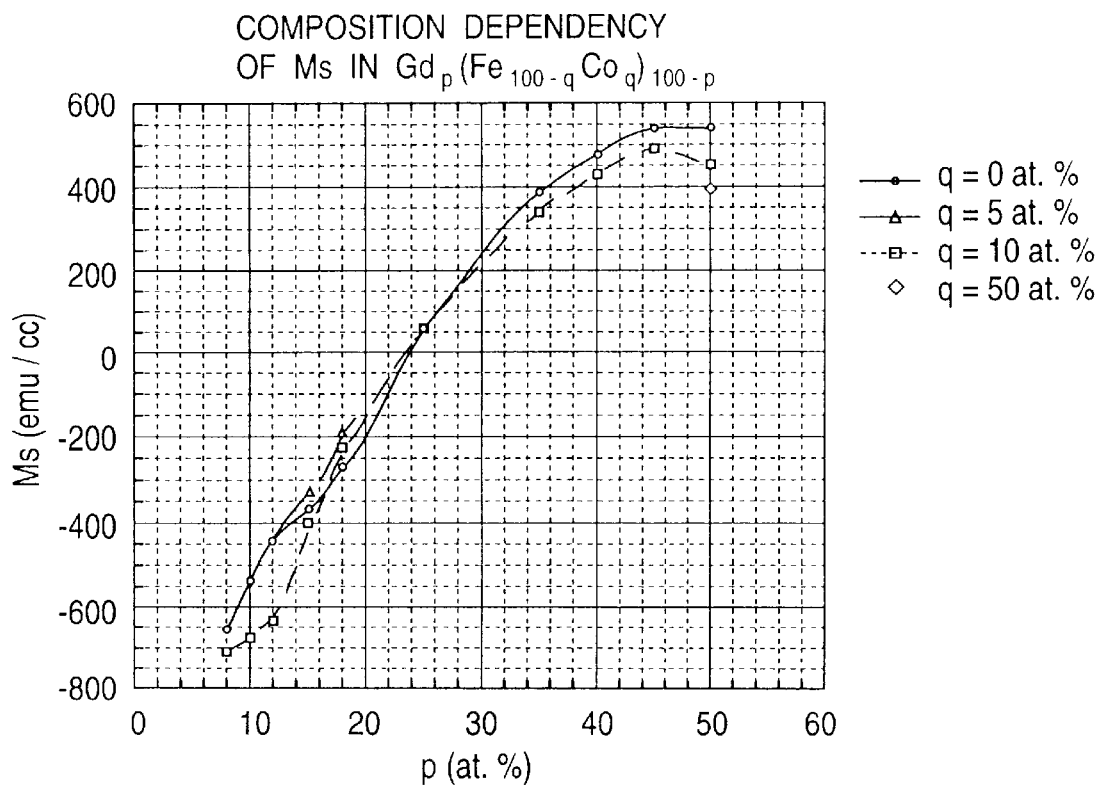
FIG. 11 is a diagram showing a composition dependency of a saturation magnetization Ms of GdFeCo which is used in an intermediate layer of the invention.
Figure 12:
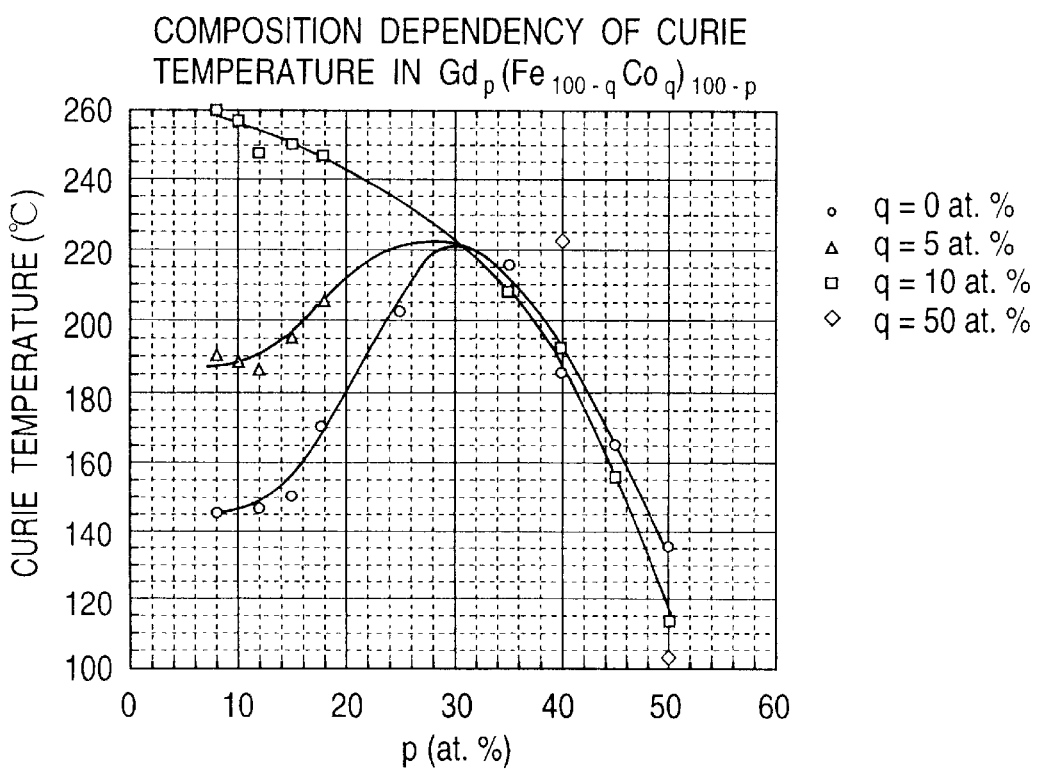
FIG. 12 is a diagram showing a composition dependency of a Curie temperature of GdFeCo which is used in the intermediate layer of the invention.

FIGS. 11 and 12 show composition dependencies of the saturation magnetization Ms of GdFeCo and the Curie temperature as an example of the rare earth-iron group amorphous alloy. A relation such that the saturation magnetization Ms>0 denotes a rare earth element sub-lattice magnetization dominance (RE rich) at room temperature. A relation such that Ms<0 indicates an iron group element sub-lattice magnetization dominance (TM rich).

As shown in FIG. 11, in the rare earth-iron group amorphous alloy, the saturation magnetization Ms doesn't largely depend on a Co content but increases with an increase in quantity of the rare earth element. As shown in FIG. 12, in case of the rare earth element sub-lattice magnetization dominant composition, Ms doesn't depend on the Co content but decreases with an increase in quantity of the rare earth element. Therefore, in the rare earth element sub-lattice magnetization dominant composition, it is difficult to independently change both of Ms at room temperature and the Curie temperature. For example, when the Curie temperature drops, Ms at room temperature increases. Since the in-plane magnetic anisotropy of the intermediate layer 12, consequently, becomes too strong, it is difficult that the intermediate layer 12 becomes the perpendicular magnetization film at a temperature at which the magnetization of the memory layer 13 is transferred.

On the other hand, when using the iron group element sub-lattice magnetization dominant composition, as shown in FIG. 12, the Curie temperature doesn't largely depend on a content of the rare earth element but rises due to an increase in Co content. It is, therefore, easy to realize a combination of Ms at room temperature and the Curie temperature, which is hard to be realized in case of using the rare earth element sub-lattice magnetization dominant composition. When a medium is designed, an optimum physical value can be given in accordance with the specification of a thermal structure of the medium and the specification of the reproducing apparatus.

In case of the rare earth sub-lattice magnetization dominant composition, Ms slowly decreases in response to a temperature change. In case of the iron group sub-lattice magnetization dominant composition, on the other hand, Ms suddenly changes in response to a temperature change. For example, FIGS. 13A, 13B, 13C, and 13D show temperature changes of the saturation magnetization Ms of each of GdFe and GdFeCo.

Figure 13A:
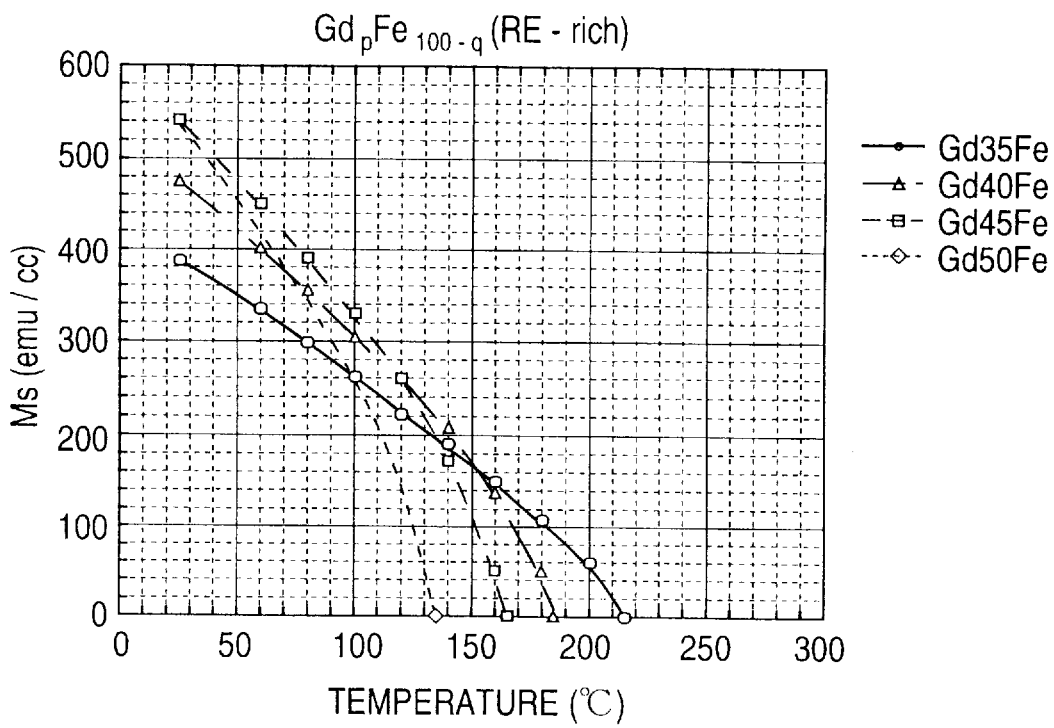
FIGS. 13A through 13D are diagrams showing a temperature change in magnetization of GdFe or GdFeCo which is used in the intermediate layer of the invention.
Figure 13B:
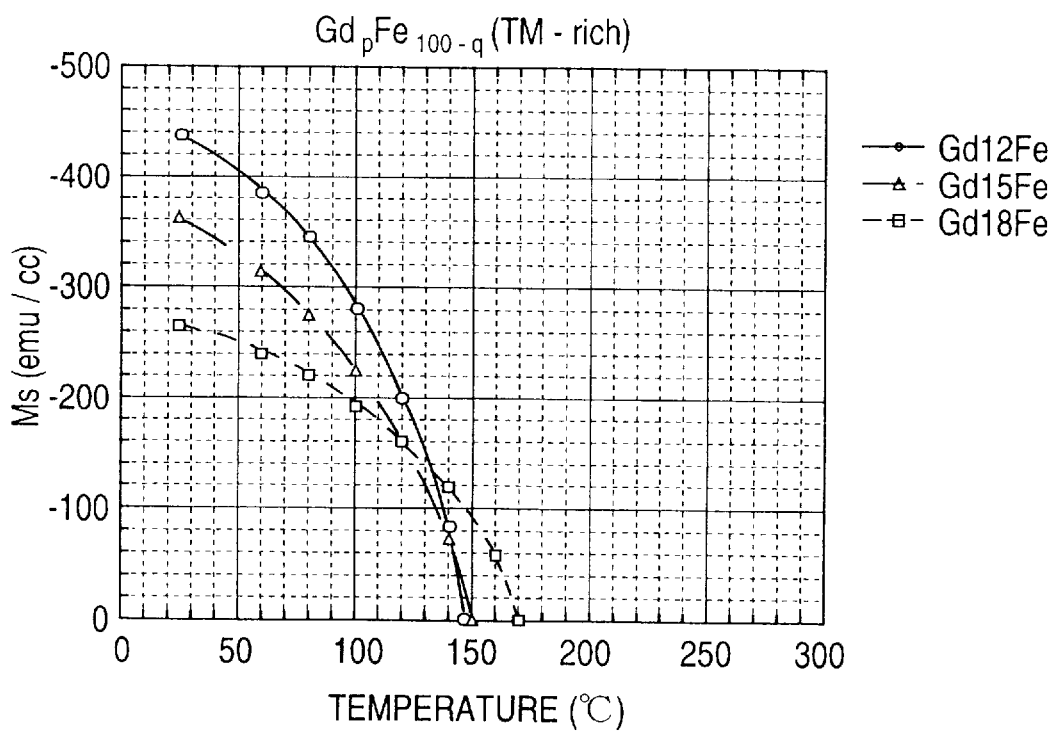
Figure 13C:
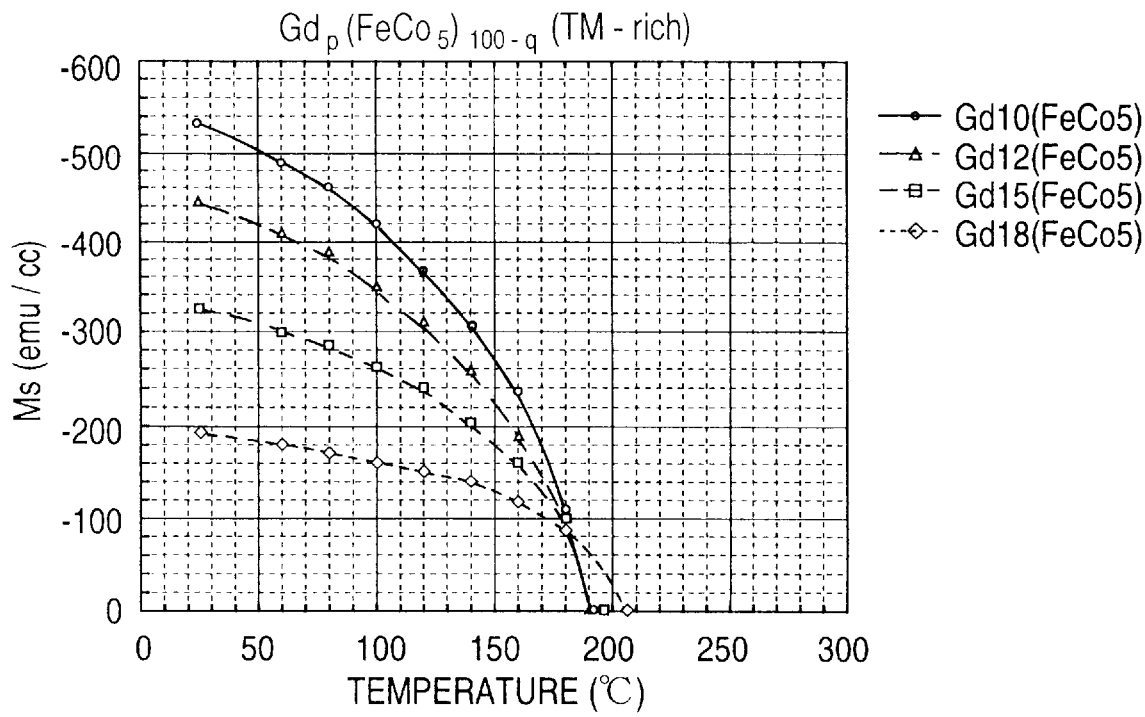
Figure 13D:
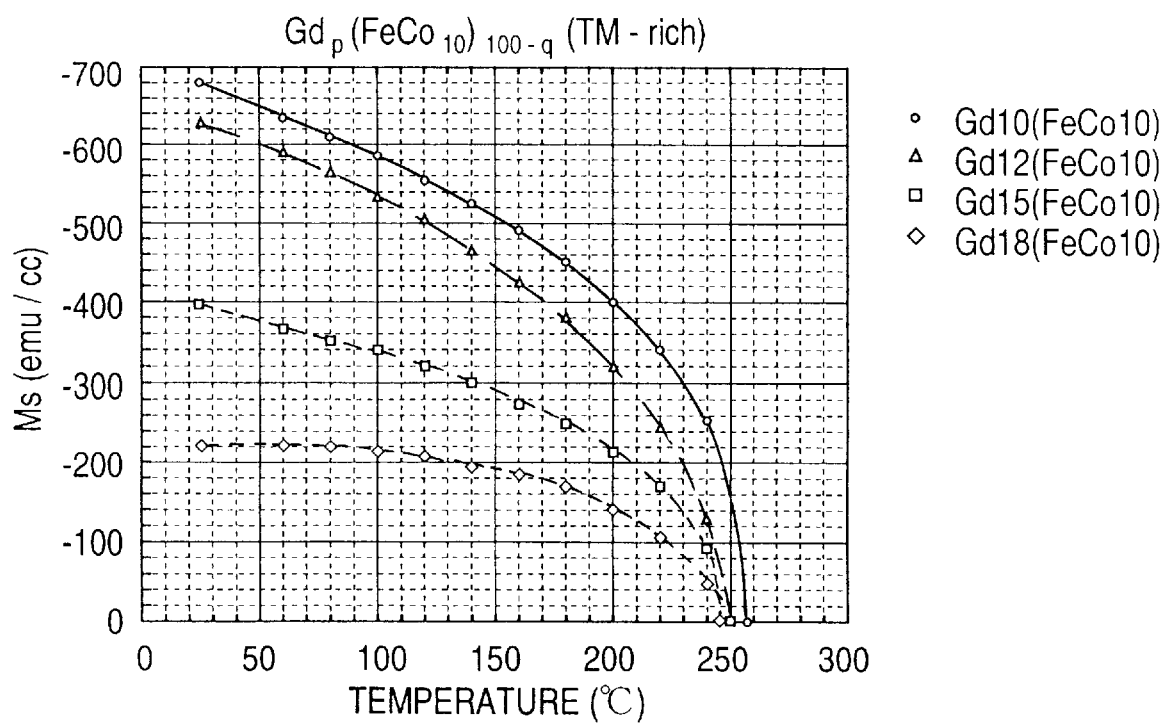

FIG. 13A shows the case of the rare earth sub-lattice magnetization dominant composition while FIGS. 13B, 13C and 13D respectively show the cases of the iron group sub-lattice magnetization dominant compositions. As shown in the diagrams, as compared with the rare earth element sub-lattice magnetization dominant composition, a change rate of Ms for the temperature change in case of the iron group element sub-lattice magnetization dominant composition is higher. This means that a region in which a perpendicular transition occurs from the in-plane as a boundary between the mask region of the reproduction layer and the aperture region can be suppressed to a narrow region. It is, consequently, possible to presume that the iron group element sub-lattice magnetization dominant composition is more advantageous in terms of a C/N ratio and crosstalks.

In the invention, in order to more perfectly mask the magnetization of the memory layer 13 in the low temperature region and to intervene the exchange coupling force from the memory layer 13 in the middle temperature region, the iron group sub-lattice magnetization dominant composition is used as an intermediate layer 12.

When the Curie temperature rises as a result that the content of Co is increased for the purpose of controlling Ms and the perpendicular magnetic anisotropy by using the rare earth-iron group amorphous alloy, it is also possible to reduce the Curie temperature by adding a nonmagnetic element such as Cr, Al, Si, Cu, or the like.

When GdFe or GdFeCo is used as a main component for the intermediate layer 12, it is desirable to use the composition which satisfies the following expression.

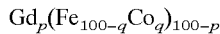

[8≦p≦15 (atom %), 0≦q≦50 (atom %)]

Figure 14:
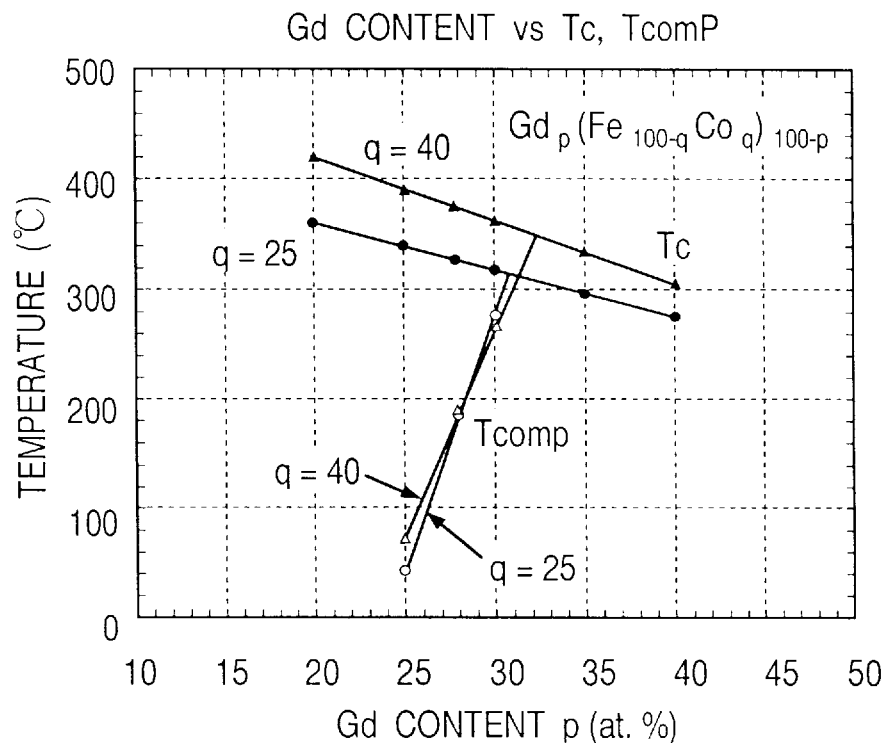
FIG. 14 is a diagram showing a composition dependency of a compensation temperature of GdFeCo and a Curie temperature.

First, explanation will be made with respect to p. When p>18 in the intermediate layer 12 of GdFeCo, since the intermediate layer 12 substantially becomes the perpendicular magnetization film, in the low temperature region, the reproduction layer 11 can become the in-plane magnetization film and the super-high resolution reproduction cannot be realized. As will be explained in detail later, on the other hand, it is desirable that the reproduction layer 11 has a compensation temperature Tcomp between room temperature and the Curie temperature. As shown in FIG. 14, when GdFeCo is used in the reproduction layer 11, the compensation temperature Tcomp exists between room temperature and the Curie temperature when a content of Gd is equal to or less than 32 (atom %). Ms at room temperature of such a composition is equal to about 350 emu/cc. It is desirable that Ms of the intermediate layer 12 is larger than Ms of the reproduction layer 11 so as to enhance the in-plane magnetic anisotropy of the reproduction layer 11. For this purpose, it is desirable that the composition of the intermediate layer 12 is set to p<15 in which Ms is equal to or larger than 350 emu/cc. When p<8, on the contrary, since the in-plane anisotropy is too strong, the intermediate layer 12 doesn't smoothly become the perpendicular magnetization film at the magnetization transfer temperature and the C/N ratio deteriorates.

It is, therefore, preferable to set to [8≦p≦15 (atom %)]. Further, in order to generally set Ms at room temperature to 600 emu/cc or less, it is more desirable to set to [10≦p≦15 (atom %)]. So long as such a relation is satisfied, both of the C/N ratio and the crosstalks can be satisfied.

Explanation will now be made with respect to q as a value indicative of the Co content. In case of the iron group sub-lattice magnetization dominant composition as shown in FIG. 12, the Curie temperature rises with an increase in Co content. In association with the increase in Curie temperature, the perpendicular magnetic anisotropy deteriorates and the in-plane anisotropy is enhanced. To suppress the Curie temperature to a low value in accordance with a reproducing power and to select the optimum perpendicular magnetic anisotropy, it is desirable to set to [0≦q≦50 (atom %)] when also considering a case where the nonmagnetic element such as Cr or the like is added for the purpose of preventing a corrosion resistance or the like. The Curie temperature of the memory layer 13 is ordinarily set to 270° C. or less in consideration of an output of a laser diode which is used for recording. Since the Curie temperature of the intermediate layer 12 is set to the Curie temperature of the memory layer 13 or less, it is further desirable to set GdFeCo of the intermediate layer to [$0 \leq q \leq 10$ (atom %)] from FIG. 12.

The memory layer 13 is a layer to hold the recording information. It is necessary that the magnetic domain can be stably held. As a material, a material in which a perpendicular magnetic anisotropy is large and the magnetization state can be stably held can be used. For example, it is possible to use a rare earth-iron group amorphous alloy such as TbFe, TbFeCo, DyFe, DyFeCo, TbDyFeCo, or the like, garnet, or a platinum group-iron group periodic structural film, for example, Pt/Co, Pd/Co platinum group-iron group alloy such as PtCo, PdCo, or the like.

An element to improve a corrosion resistance such as Al, Ti, Pt, Nb, Cr, or the like can be also added to the reproduction layer 11, intermediate layer 12, and memory layer 13. In addition to the reproduction layer 11, intermediate layer 12, and memory layer 13, in order to raise an interference effect and a protecting performance, a dielectric substance such as SiNx, AlkOx, TaOx, SiOx, or the like can be also provided. To improve a thermal conductivity, a layer having a good thermal conductivity such as Al, AlTa, AlTi, AlCr, Cu, or the like can be also provided. An initialization layer in which the magnetization is aligned in one direction to perform a light modulation overwriting and an auxiliary layer to assist the recording and reproduction for adjusting an exchange coupling force or a magnetostatic coupling force can be also provided. Further, a protecting coating made of the dielectric material layer or a high molecular resin can be also added as a protective film.

There isn't any special limitation in the recording method for the magneto-optical recording medium of the invention. So long as a recording magnetic domain can be formed in the memory layer 13 in accordance with a data signal, conventional various well-known magnetooptic recording methods can be used. Three typical recording methods will be mentioned below.

According to the first recording method, after the record was once deleted, the recording is performed by modulating a laser power while applying a magnetic field in the recording direction. According to the second recording method, a laser power is modulated while applying an external magnetic field, thereby overwrite recording new data onto old data. In case of those light modulation recording methods, if an intensity of a laser beam is determined in consideration of a linear velocity of the recording medium so that a temperature of only a predetermined region in a light spot approaches the Curie temperature of the memory layer, a recording magnetic domain of a diameter that is equal to or less than that of the light spot can be formed, so that a signal of a period which is equal to or less than the diffraction limit of the light can be recorded. According to the third recording method, an external magnetic field is modulated while irradiating a laser beam of a power such that a temperature of the memory layer is equal to or higher than the Curie temperature, thereby overwrite recording. In this case, by raising a modulating speed in accordance with a linear velocity, a recording magnetic domain of a diameter that is equal to or less than that of the light spot can be formed, so that a signal of a period which is equal to or less than the diffraction limit of the light can be recorded.

As will be obviously understood from a mechanism, which will be explained later, in order to allow the super-high resolution of the invention to stably function, it is desirable that the magnetization around the recording mark is directed to the direction opposite to the mark.

According to the most general first recording method, first, the laser power is set to a constant high power in a state in which a predetermined magnetic field has been applied, a magnetization of a track to be recorded is initialized (erasing operation), and after that, the intensity of the laser power is modulated in a state in which the direction of the magnetic field has been inverted, thereby forming a desired recording mark. In this instance, if there is a portion in which the direction of the magnetization around the recording mark is random, it becomes a cause of noise upon reproduction. In order to raise the quality of the reproduction signal, therefore, such a portion is generally erased by a width wider than the recording mark. Therefore, since the direction of the magnetization around the recorded magnetic domain is certainly opposite to that of the recorded magnetic domain, according to the recording method, the super-high resolution of the invention stably functions.

According to the second recording method, a medium having not only the memory layer to hold the recording information as disclosed in Japanese Patent Application Laid-Open No. 62-175948 but also a writing layer in which the magnetization has been directed to one direction prior to recording is used, thereby performing an overwriting which doesn't need the erasing operation prior to recording. By further providing such an arbitrary writing layer for the medium of the invention, such an overwriting can be performed. According to the recording method, a laser intensity is modulated to Ph and Pl (Ph>Pl) in accordance with the recording information while applying a predetermined magnetic field of the direction opposite to that of the writing layer. When a temperature of the medium rises to a temperature Th corresponding to Ph, since Th is almost equal to Tc of the writing layer, the magnetization of each of the memory layer and the writing layer are directed to the direction of the external magnetic field and form a magnetic domain. When the temperature of the medium rises up to only a temperature Tl corresponding to Pl, the direction of the magnetization is the same as that of the writing layer. Such a process occurs irrespective of the magnetic domain which has previously been recorded. As mentioned above, when the laser beam of Ph is irradiated to the medium, although a temperature of the portion to form the recording magnetic domain has risen to Th, the temperature distribution in this instance is two-dimensionally spread, a portion whose temperature has risen up to only Tl certainly occurs around the magnetic domain. Therefore, a portion having the magnetization in the opposite direction exists around the recording magnetic domain. Namely, even in the recording method, the super-high resolution of the invention stably functions.

According to the third recording method, a magnetic field modulation recording in which the direction of the external magnetic field mentioned above is alternately changed can be mentioned. Although the magnetic field modulation is performed while DC irradiating the laser beam by a high power in such a method, in order to record new information without remaining a career of the magnetic domain which has been recorded before, a width to form the magnetic domain has to be always made constant. In this case, therefore, unless some procedure is taken, a region in which the direction of the magnetization is random exists around the recording magnetic domain and the super-high resolution of the invention doesn't stably function. When the magnetic field modulation recording is performed, therefore, it is necessary to perform the initializing operation by a power larger than the ordinary recording power at the time of the shipping of the medium or before the first recording or to previously totally perform the initialization of the magnetization for both of the land and the groove.

An information reproducing method of the invention will now be described.

FIGS. 5A to 5C are diagrams for explaining the information reproducing method of the magneto-optical recording medium of the invention. FIG. 5A is a schematic diagram showing a mask region, an aperture region, and the like in a spot on the plate surface of the medium. FIG. 5B is a schematic cross sectional view showing a magnetization direction state of each layer. FIG. 5C is a graph showing a temperature distribution in the disk traveling direction at the track center of the corresponding portion. Tl-mask and Th-mask in the temperature distribution graph indicate temperatures of the boundary portion between the front mask 4 and rear mask 5.

When the disk is moved to the right-hand while irradiating the laser beam to the magneto-optical recording medium (optical disk) of the invention, a state of the spot 2 and a magnetization state of each magnetic layer are as shown in FIG. 5B. In this instance, the disk is moving at about 9 m/sec and since there is a heat accumulation by the laser irradiation, the position at which the film temperature is maximum is located on the rear side than the center of the spot 2. On the front edge side for the traveling direction of the spot 2, a temperature of the medium does not so highly rise than room temperature. As for the saturation magnetization Ms of each of the reproduction layer 11 and intermediate layer 12, the saturation magnetization Ms of each of the layers is large and a perpendicular magnetic anisotropy Ku is small in the low temperature region in the spot. In this instance, assuming that a perpendicular magnetic anisotropy of the reproduction layer 11 is set to Ku1 and a saturation magnetization is set to Ms1 and an energy to direct the magnetization of the reproduction layer 11 to the perpendicular direction by the exchange coupling force from the memory layer 13 through the intermediate layer 12 is set to Ew13, when the following relation (1).

$$2\pi Ms1^2 > Ku1 + Ew13 \quad (1)$$

is satisfied, the magnetization of the reproduction layer 11 is directed in the film surface. Particularly, since the saturation magnetization of the intermediate layer 12 is further larger than that of the reproduction layer 11 and the in-plane anisotropy is strong, there is a function such that the interface magnetic wall energy between the memory layer 13 as a perpendicular magnetization film and the reproduction layer 11 as an in-plane magnetization film is absorbed by the intermediate layer 12. Therefore, by providing the intermediate layer 12, as compared with the case where the intermediate layer 12 doesn't exist, even if a film thickness of the reproduction layer 11 is made thin, the direction of the magnetization is directed in the film surface. The magnetization of the memory layer 13 is not transferred but the front mask 4 is formed.

Figure 15:
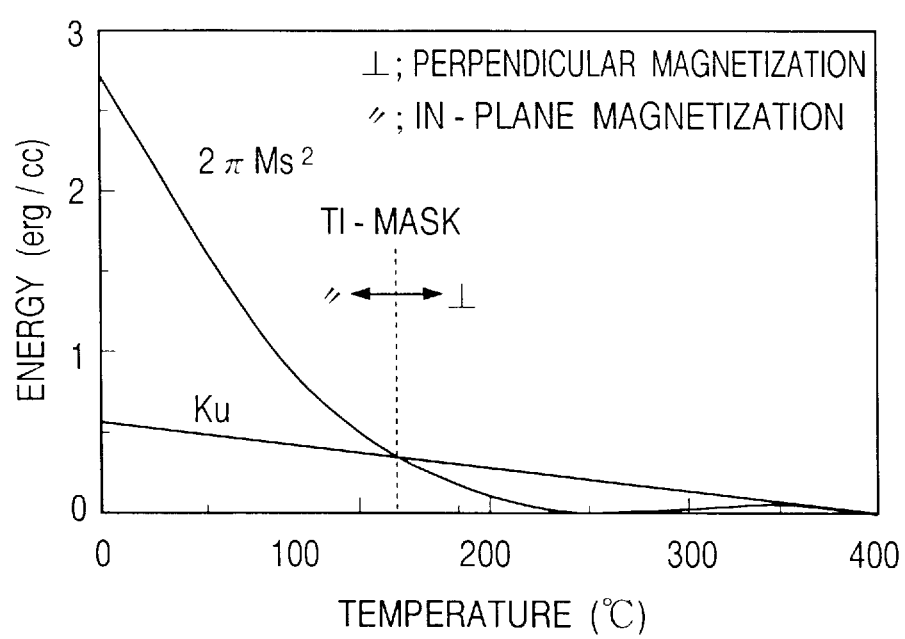
FIG. 15 is a diagram showing an example of temperature characteristics of an anti-magnetic field energy and a perpendicular magnetic anisotropy of a reproduction layer of the magneto-optical recording medium of the invention.

Subsequently, when the medium temperature rises by the irradiation of the spot 2, the saturation magnetization Ms of each of the reproduction layer 11 and intermediate layer 12 gradually decreases. As shown in FIG. 15, therefore, the temperature of the medium reaches a predetermined temperature Tth (Tl-mask) and when the following relation (2)

$$2\pi Ms1^2 < Ku1 + Ew13 \quad (2)$$

is satisfied, the reproduction layer 11 becomes the perpendicular magnetization film and is simultaneously exchange-coupled to the memory layer 13. Thus, the magnetic domain held in the memory layer 13 is transferred to the reproduction layer 11 and the aperture 3 is formed. When the temperature further rises to a value higher than the Curie temperature of the intermediate layer 12, the exchange coupling force between the reproduction layer 11 and memory layer 13 disappears. At this temperature, the composition is previously adjusted (namely, anti-parallel) so that the reproduction layer 11 becomes rare earth element sub-lattice magnetization dominant and the memory layer 13 becomes iron group element sub-lattice magnetization dominant. Thus, as for the magnetic domain transferred to the reproduction layer 11 at a temperature which is equal to or less than the Curie temperature of the intermediate layer 12, the exchange coupling force from the memory layer 13 holding the magnetic domain is eliminated and the magnetostatic coupling force from the memory layer 13 is applied in the opposite direction. Since the temperature of the reproduction layer 11 is also close to the compensation temperature, an influence on the reproduction layer 11 itself by the anti-magnetic field is also small, so that the magnetic domain of the reproduction layer 11 transferred from the memory layer 13 cannot withstand a Bloch magnetic wall energy but contracts and is inverted. Namely, in a portion whose temperature has risen to the Curie temperature of the intermediate layer 12 or higher in the spot 2, a region in which no magnetic domain can exist in the reproduction layer and is aligned in the same direction occurs. Such a portion becomes what is called a rear mask 5. A forming step of such a rear mask 5 occurs from a change in balance of the energy regarding an interaction between the magnetic layers. Therefore, in particular, the mask is formed without applying an external magnetic field for reproduction.

The operation of the magnetic domain transferred to the reproduction layer 11 in the step of transferring from the aperture portion 3 to the rear mask 5 will be further described in detail.

Figure 6:
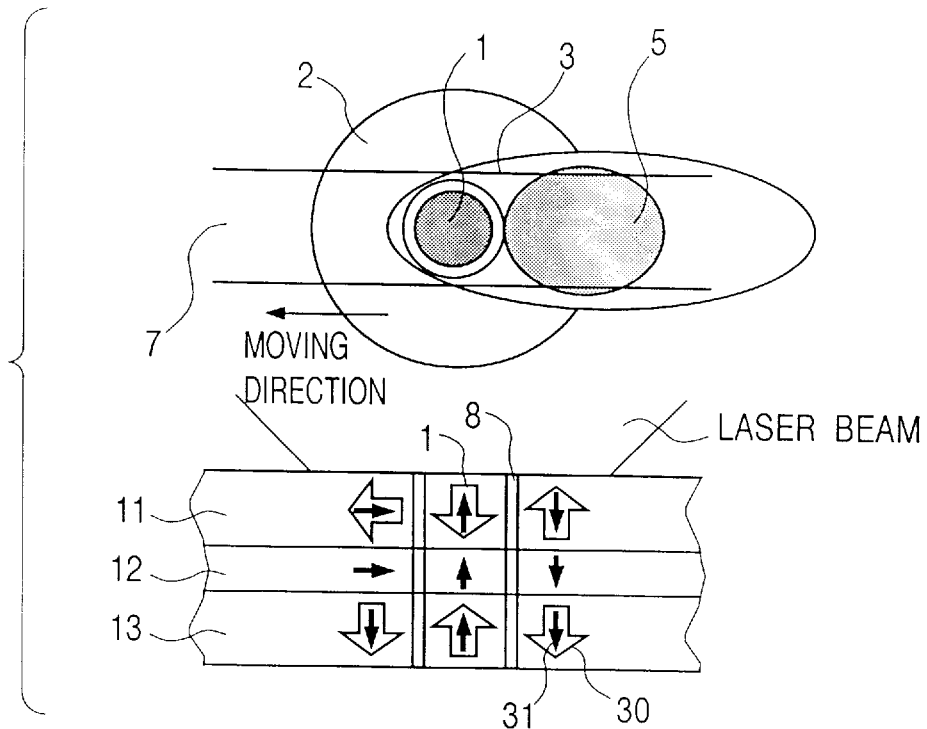
FIG. 6 is a diagram for explaining a principle in which a high temperature region in a spot in the magneto-optical recording medium of the invention is masked.
Figure 7:
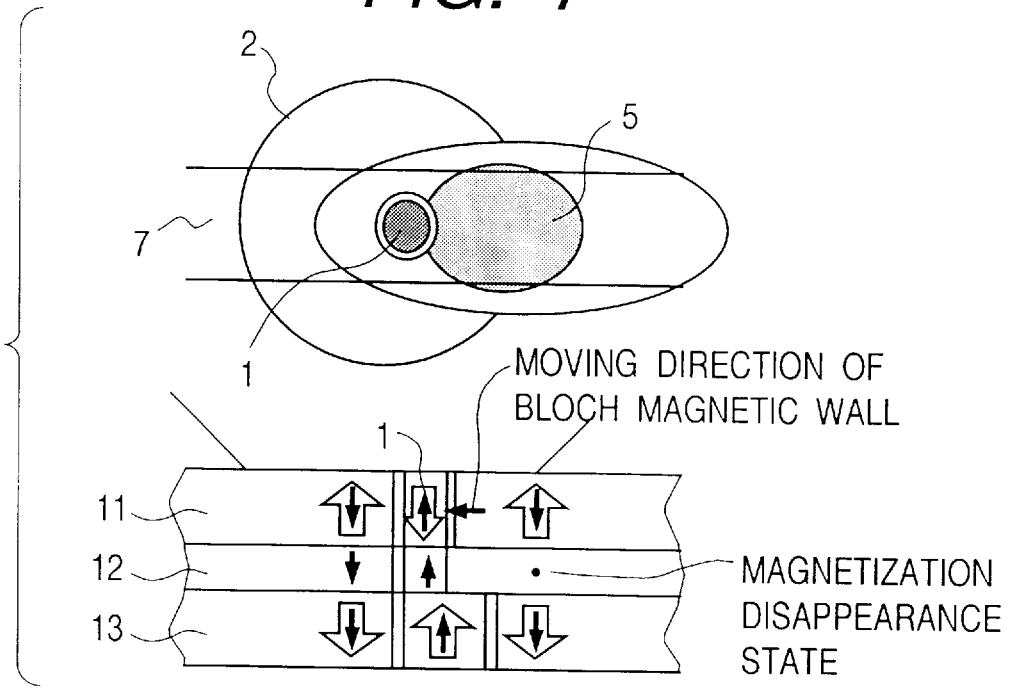
FIG. 7 is a diagram for explaining a principle in which a high temperature region in the spot in the magneto-optical recording medium of the invention is masked.
Figure 8:
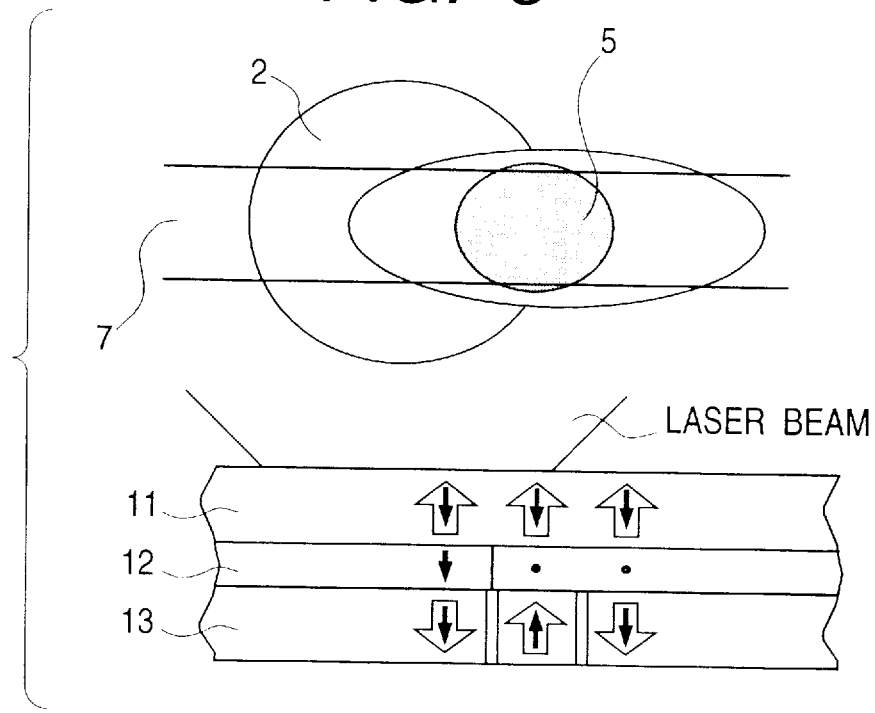
FIG. 8 is a diagram for explaining a principle in which a high temperature region in the spot in the magneto-optical recording medium of the invention is masked.

FIGS. 6 to 8 are diagrams for explaining the principle in which the high temperature region in the spot 2 in the magneto-optical recording medium of the invention is masked. For simplicity of explanation, a contracting step of one recording magnetic domain is shown. As shown in the diagram, a recording magnetic domain 1 (hereinafter, simply referred to as a recording magnetic domain) of the reproduction layer 11 transferred from the memory layer 13 contracts in the high temperature region when the light spot moves. It is now presumed that a rare earth iron group ferrimagnetic material is used as a magnetic material. A white-on-black arrow 30 shows a whole magnetization and a black arrow 31 denotes an iron group sub-lattice magnetization. The layers are shown and disclosed on the assumption that the reproduction layer 11 is a magnetic layer of RE rich and the memory layer 13 is a magnetic layer of TM rich. Since there is a limitation of a thermal conductivity, the temperature distribution of the medium is deviated from the center of the spot 2 in the direction opposite to the moving direction of the spot 2.

FIG. 6 shows a state in which the recording magnetic domain 1 exists in the region of the aperture 3. In addition to an effective magnetic field Hwi by the exchange coupling force from the memory layer 13, an effective magnetic field Hwb by the Bloch magnetic wall energy and a magnetostatic field Hd from the inside of the medium are applied to the recording magnetic domain 1. Although Hwi functions so as to stably hold the recording magnetic domain 1 of the reproduction layer 11, Hwb and Hd function so as to apply a force in such a direction as to extend or contract the recording magnetic domain. Therefore, now assuming that a coercive force of the reproduction layer 11 is set to Hc1, in order to allow the reproduction layer 11 to stably transfer the magnetization of the memory layer 13, until the recording magnetic domain 1 reaches the high temperature region 5, the condition of the following relation (3) need to be satisfied.

$$|Hwb-Hd|<Hc1+Hwi \quad (3)$$

[T<Th-mask]
Since the coercive force Hc1 of the reproduction layer 11 seems to be large by the exchange coupling force from the memory layer 13, the relation (3) is easily satisfied. The magnetization information of the memory layer 13 is stably transferred and the recording information can be reproduced.

Now, assuming that a surface magnetic wall energy of each of the reproduction layer 11 and memory layer 13 is set to σwi and a saturation magnetization of the recording magnetic domain 1 of the reproduction layer 11 is set to Ms1 and a film thickness of the reproduction layer is set to h1, the effective magnetic field Hwi by the exchange coupling force from the memory layer 13 is expressed by the following equation (4).

$$Hwi=\sigma wi/2Ms1 \cdot h1 \quad (4)$$

Further, when the spot 2 moves and enters the high temperature region 5, Hwi reaches a temperature near the Curie temperature of the intermediate layer 12, σwi suddenly decreases, and Hwi decreases. The reproduction layer 11, therefore, is returned to an inherent state of a small coercive force as shown by the following relation (5).

$$|Hwb-Hd|>Hc1+Hwi \quad (5)$$

[T>Th-mask]
A Bloch magnetic wall 8 of the recording magnetic domain 1 easily moves.

Now, assuming that a Bloch magnetic wall energy of the reproduction layer 11 is set to σwb and a radius of the recording magnetic domain 1 of the reproduction layer 11 is set to r, the effective magnetic field Hwb by the Bloch magnetic wall energy is expressed by the following equation (6).

$$Hwb=\sigma wb/2Ms1 \cdot r \quad (6)$$

Figure 9:
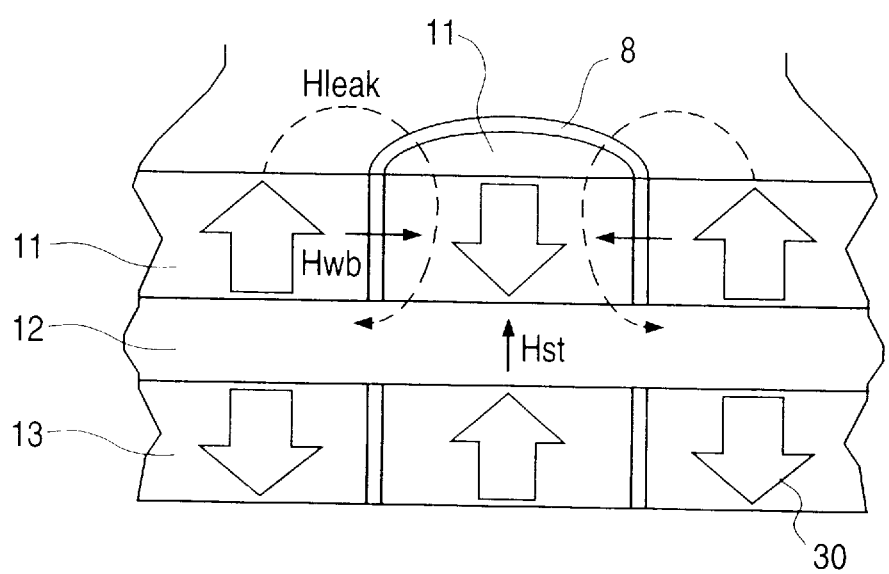
FIG. 9 is a diagram showing magnetostatic fields Hleak and Hst which are applied to a recording magnetic domain transferred to a reproduction layer and an effective magnetic field Hwb by a Bloch magnetic wall energy.

Thus, Hwb functions in such a direction as to contract the recording magnetic domain 1 (refer to FIG. 9). Therefore, when (Hwb−Hd) becomes dominant to positive (the sign is +) and the following relation (7) is satisfied, $$Hwb-Hd>Hc1+Hwi \quad (7)$$

[T>Th-mask]
the recording magnetic domain 1 contracts.

As mentioned above, when entering the high temperature region, the recording magnetic domain 1 contracts and is inverted as shown in FIG. 7 and, finally, the whole magnetization is oriented in the erasing direction as shown in FIG. 8.

Namely, as shown in FIG. 5B, in the high temperature region in the spot 2, since the reproduction layer 11 always becomes the perpendicular magnetization film oriented in the erasing direction, it functions as an optical mask (rear mask 5). As shown in FIG. 5A, therefore, the spot 2 is apparently converged into a narrow region excluding the high temperature region (rear mask 5) and the region (front mask 4) of the in-plane magnetization film at a low temperature. The aperture 3 is formed in the middle temperature region other than those regions and the recording magnetic domain (recording mark 1) of a period which is equal to or less than the detection limit can be detected.

According to the conventional super-high resolution method, as disclosed in Japanese Patent Application Laid-Open No. 4-255946, a mask is formed by the following relation (8)

$$Hr>Hc1+Hwi \quad (8)$$

by using an external magnetic field Hr.

According to the invention, even if there is no external magnetic field Hr, since the mask can be formed by changing a magnitude of an effective magnetic field (Hw−Hd) in the medium, the external magnetic field is unnecessary.

Subsequently, the effective magnetic field (Hw−Hd) is made dominant to positive at a high temperature. Namely, a method of contracting the recording magnetic domain 1 will be further specifically explained. The magnetostatic field Hd from the inside of the medium in the relation (7) comprises a leakage magnetic field Hleak from an ambient erasing magnetization, a magnetostatic field Hst from the magnetization of the memory layer 13, and the like and is expressed by the following equation (9).

$$Hd=Hleak \pm Hst \quad (9)$$

In the magnetostatic field Hd, Hleak functions in such a direction as to enlarge the recording magnetic domain 1 as shown in FIG. 9. As a method of easily contracting the recording magnetic domain 1 in the high temperature region, for example, there are the following two methods.

The first method is a method of decreasing Hleak and reducing the magnetic field which obstructs the inversion of the recording magnetic domain 1. Now, assuming that a saturation magnetization of the reproduction layer 11 around the recording magnetic domain to be extinguished is set to Ms1" and the radius of the recording magnetic domain 1 is set to r, Hleak is roughly expressed by the following equation (10).

$$Hleak=4\pi Ms1" \cdot h1/(h1+3/2r) \quad (10)$$

Figure 16:
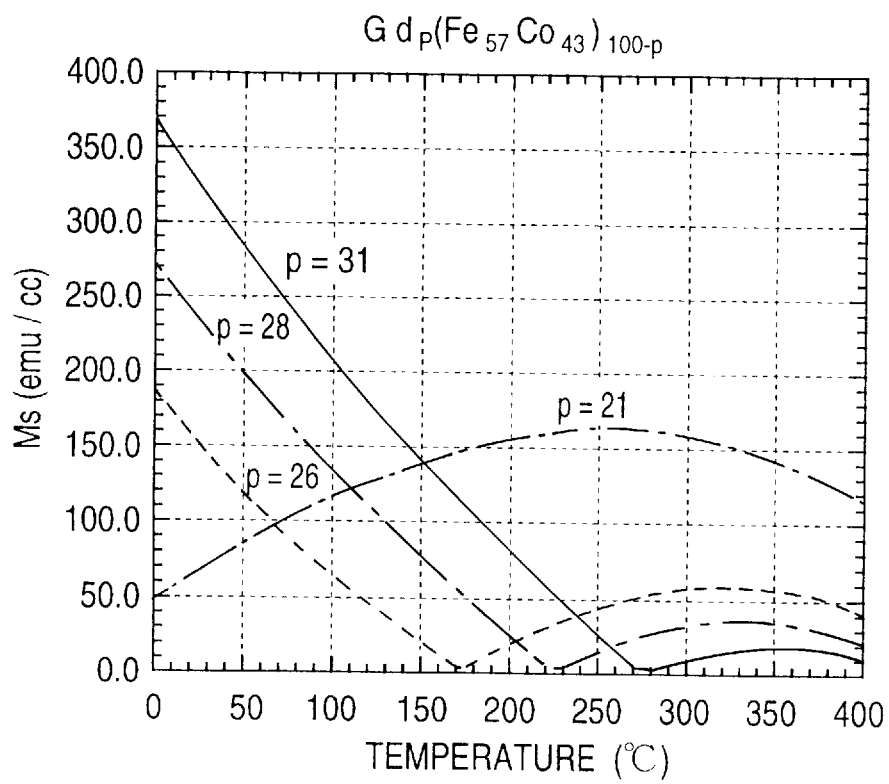
FIG. 16 is a diagram showing a temperature change in saturation magnetization with respect to GdFeCo of different compensation temperatures.

In the equation (10), since the radius r of the recording magnetic domain and the film thickness h1 of the reproduction layer 11 cannot be easily changed, it is desirable to reduce Ms1". In this case, it is sufficient to select a material whose compensation temperature exists between room temperature and the Curie temperature as a reproduction layer 11. This is because since the magnetization is small at the compensation temperature, Hleak can be easily reduced. A case of using GdFeCo is used as a reproduction layer 11 will now be explained as an example. FIG. 16 is a diagram showing a temperature dependency of Ms of GdFeCo of different compensation temperatures. Although the highest temperature on the medium upon reproduction differs depending on a reproducing power, generally, the highest temperature shown in the diagram generally reaches a value about within a range from 160° to 220° C. Since the middle temperature region is a region whose temperature is lower than such a highest temperature by about a value within a range from 20° to 60° C., so that Ms1" is large in case of p=21 in FIG. 16. Consequently, Hleak is large. When a composition whose compensation temperature lies within a range between room temperature and the Curie temperature is used as a reproduction layer 11, Ms in each of the middle temperature region and high temperature region decreases, so that Hd can be reduced. When using GdFeCo as a reproduction layer 11, the compensation temperature strongly depends on, particularly, the composition of the rare earth element (Gd) as shown in FIG. 14. Therefore, when the magnetic layer mainly containing GdFeCo is used as a reproduction layer 11, it is desirable to set Gd amount to 25 to 35 (atom %).

Figure 10A:
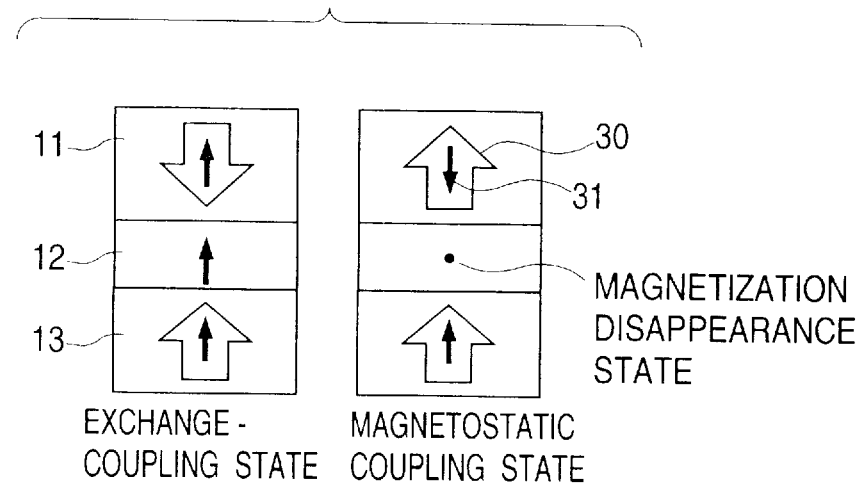
FIGS. 10A and 10B are diagrams showing stable magnetization states when an exchange coupling force and a magnetostatic coupling force in the medium of the invention are respectively dominant.
Figure 10B:
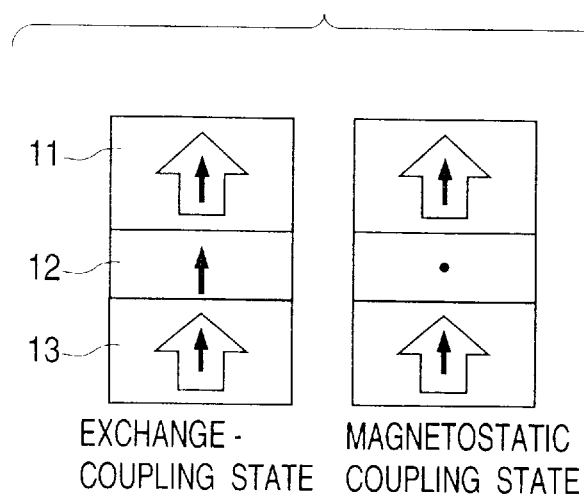

The second method is a method of increasing the magnetostatic field Hst from the memory layer 13 to the negative side, thereby facilitating the inversion of the recording magnetic domain 1. In the relation (7), whether Hst is set to a mode where the recording magnetic domain 1 contracts or a mode where it is held as it is is determined in dependence on whether the reproduction layer 11 and memory layer 13 are the parallel type or the anti-parallel type at a time point when entering the high temperature region from the exchange coupling region. This is because of the following reasons. As shown in FIGS. 10A and 10B, the exchange coupling force is directed to the TM sub-lattice magnetization of a strong exchange force and the magnetostatic coupling force is directed to the whole magnetization. FIG. 10A shows the anti-parallel type in which the reproduction layer 11 is RE rich and the memory layer 13 is TM rich. In this case, when the intermediate layer 12 reaches a temperature near the Curie temperature and the exchange coupling is cut out, the recording magnetic domain 1 tries to invert the magnetization by the magnetostatic coupling force with the memory layer 13 (Hst is set to a negative value). On the contrary, as shown in FIG. 10B, in case of the parallel type (in the diagram, a case where both of the reproduction and memory layers are TM rich is shown), the magnetostatic coupling force functions in such a direction as to maintain the exchange coupling state (Hst is set to a positive value). Therefore, in order to invert the recording magnetic domain 1, it is desirable to construct the anti-parallel type.

Specifically speaking, for example, it is sufficient to use the ferrimagnetic material as both of the reproduction layer 11 and memory layer 13 and to reverse the kinds of dominant sub-lattice magnetization states. For example, the reproduction layer 11 and memory layer 13 are made of a rare earth (RE) iron group (TM) element alloy, the reproduction layer 11 is a magnetic layer which is rare earth element sub-lattice magnetization dominant (RE rich), and the memory layer 13 is a magnetic layer which is iron group element sub-lattice magnetization dominant (TM rich) at room temperature. It is necessary that the anti-parallel structure is accomplished at least at a temperature (within a range between the middle temperature region and the high temperature region mentioned above) at a time point when the recording magnetic domain 1 contracts.

The value of Hst can be roughly calculated by using the radius of the recording magnetic domain 1 on the assumption of the cylindrical magnetic domain, the distance from the magnetic domain of the memory layer 13, and a saturation magnetization Ms2 of the memory layer (Refer to Tadashi Kobayashi, "The Study about Magnetism and Magnetooptic Effect of Rare Earth-iron group Amorphous Alloy Thin Film and its Compound Film", the doctoral thesis of Nagoya University, pages 40–41, March, 1993). Hst is proportional to the saturation magnetization Ms2 of the memory layer. Therefore, it is desirable to set to a large value such that the stability of the recording information doesn't deteriorate and that the erasure magnetization is not inverted.

The magnetostatic field Hst from the memory layer 13 mentioned above also acts on the magnetization in the erasing direction. When the magnetization in the erasing direction is inverted by Hst, however, since a magnetic wall is formed in a wide range in the high temperature region, the magnetic wall energy largely rises. Therefore, the magnetization is not inverted but the magnetization in the same erasing direction is held. In the high temperature region, therefore, a region in which the magnetization is always oriented in the erasing direction is formed and becomes the rear mask 5. Now, assuming that an inversion magnetic domain radius is set to R, an effective magnetic field Hwb' of the Bloch magnetic wall energy when the erasure magnetization is inverted is expressed by the following equation (11).

$$Hwb' = \sigma wb / 2Ms1 \cdot R \qquad (11)$$

Therefore, the condition such that the erasure magnetization is not inverted by Hst is shown by the following relation (12).

$$Hwb' > Hst \qquad (12)$$

Although it is sufficient to use either one of the above two methods (a method of reducing Hleak and a method of increasing Hst to the negative side) whereby the recording magnetic domain 1 is easily inverted into an erasing state, the super-high resolution effect is most exhibited when using the above two methods.

As described above, by using the magneto-optical recording medium of the invention, the magnetization can be oriented in a uniform direction in the high temperature region 5 of the light spot without applying an external magnetic field upon reproduction and the magnetization of the memory layer 13 can be optically masked. By the above mechanism, the most efficient super-high resolution, namely, the super-high resolution system in which only a portion near the center of the spot for reproducing information contributes to the reproduction of the information, a high reproduction signal quality can be expected and further, by optimizing the film characteristics, the front mask 4 can be formed. The super-high resolution system which is also strong against crosstalks from the adjacent tracks can be realized without adding a magnet for an external magnetic field or the like to the reproducing apparatus.

Although the present invention will now be further described in detail with respect to preferred Examples, the invention is not limited to the following Examples without departing from the spirit of the invention.

EXAMPLES 1 to 8

Figure 17:
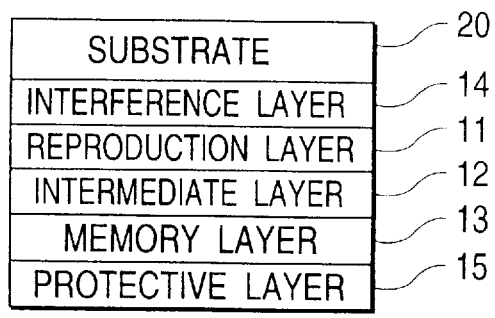
FIG. 17 is a schematic cross sectional view showing a layer structure of a magneto-optical recording medium formed in the embodiment.

Each target of Si, Gd, Tb, Fe, and Co is attached to a DC magnetron sputtering apparatus. A glass substrate having a diameter of 130 mm and the polycarbonate substrate 20 with pre-grooves are fixed to a substrate holder installed at a position where a distance from a target is equal to 150 mm. After that, the inside of a chamber is vacuum exhausted by a cryopump until a vacuum degree reaches a high vacuum degree of $1 \times 10^{-5}$ Pa or less. An Ar gas is introduced into the chamber up to 0.4 Pa while vacuum exhausting. After that, an SiN interference layer 14 of a thickness of 90 nm, the GdFeCo reproduction layer 11, the GdFe intermediate layer 12, the TbFeCo memory layer 13, and an SiN protective layer 15 having a thickness of 70 nm are sequentially formed as films, thereby obtaining a magneto-optical recording medium of the invention with a structure shown in FIG. 17. When each SiN dielectric material layer film is formed, an $N_2$ gas is introduced in addition to the Ar gas and a film is formed by a reactive sputtering while adjusting a mixture ratio thereof so as to obtain a refractive index of 2.1. Table 1 shows a composition and a film thickness, Ms at room temperature, the compensation temperature Tcomp, and the Curie temperature Tc of each of the GdFeCo reproduction layer, GdFe intermediate layer, and TbFeCo memory layer.

Recording and reproducing characteristics of the magnetooptic recording media were measured. In the measurement, an NA of the objective lens was set to 0.55, a laser wavelength was set to 780 nm, a recording power was set to 7–13 mW, and a reproducing power was set to a value within a range from 2.5 to 3.5 mW so as to obtain the highest C/N ratio. A linear velocity was set to 9 m/sec. First, after the whole surface of the medium had been erased, carrier signals of 5.8, 8, 10, and 15 MHz (corresponding to mark lengths of 0.78, 0.40, and 0.30 µm, respectively) were recorded to the recording layer and mark length dependencies of the C/N ratios were examined. Subsequently, the crosstalks with the adjacent tracks (hereinafter, abbreviated to as crosstalks) were measured. After a signal of a mark length of 0.78 µm had been recorded in the land portion by the above method and a carrier signal (referred to as C1) had been measured, the tracking is matched to a adjacent erased groove portion and a carrier signal (referred to as C2) was measured. A difference (C2-C1) between them was shown. Both of the C/N ratios and the crosstalks were measured without applying an initialization magnetic field and a reproduction magnetic field. Table 3 shows results of the measurement.

Comparison 1

A medium similar to the medium disclosed in Japanese Patent Application Laid-Open No. 3-93056 was formed by the following method and was evaluated.

First, by film forming apparatus and method similar to those in Example 1, an SiN interference layer having a thickness of 90 nm, a GdFeCo reproduction layer having a thickness of 30 nm, a TbFeCoAl intermediate layer having a thickness of 10 nm, a TbFeCo memory layer having a thickness of 30 nm, and an SiN protective layer having a thickness of 70 nm were sequentially formed as films on the glass substrate, thereby obtaining a magneto-optical recording medium of Comparison 1. As shown in Table 1, the composition of the GdFeCo reproduction layer was set in a manner such that it becomes TM rich at room temperature and Ms is equal to -180 emu/cc and the Curie temperature is equal to or higher than 300° C. The composition of the TbFeCoAl intermediate layer was set in a manner such that it becomes TM rich at room temperature and Ms is equal to -160 emu/cc and the Curie temperature is equal to 140° C. The composition of the TbFeCo memory layer was set in a manner such that it becomes TM rich at room temperature and Ms is equal to -150 emu/cc and the Curie temperature is equal to 250° C.

Subsequently, by using the magneto-optical recording medium, recording and reproducing characteristics were measured in a manner similar to Example 1. However, during the reproduction, the reproduction magnetic field in the perpendicular direction of the medium was changed to 0, 200, and 400 Oe and was applied and the characteristics were measured. Table 3 shows results of the measurement.

Comparison 2

A medium similar to the medium disclosed in Japanese Patent Application Laid-Open No. 3-255946 was formed by the following method and was evaluated.

First, by film forming apparatus and method similar to those of Example 1, an SiN interference layer having a thickness of 90 nm, a GdFeCo reproduction layer having a thickness of 30 nm, a TbFeCoAl intermediate layer having a thickness of 10 nm, a GdFeCo auxiliary layer having a thickness of 16 nm, a TbFeCo memory layer having a thickness of 40 nm, and an SiN protective layer having a thickness of 70 nm were sequentially formed as films on the glass substrate, thereby obtaining a magneto-optical recording medium of Comparison 2. As shown in Table 2, the composition of the GdFeCo reproduction layer was set in a manner such that it becomes TM rich at room temperature and Ms is equal to -160 emu/cc and the Curie temperature is equal to or higher than 300° C. The composition of the TbFeCoAl intermediate layer was set in a manner such that it becomes TM rich at room temperature and Ms is equal to -160 emu/cc and the Curie temperature is equal to 140° C. The composition of the GdFeCo auxiliary layer was set in a manner such that it becomes TM rich at room temperature and Ms is equal to -160 emu/cc and the Curie temperature is equal to 280° C. The composition of the TbFeCo memory layer was set in a manner such that it becomes TM rich at room temperature and Ms is equal to -150 emu/cc and the Curie temperature is equal to 250° C.

Subsequently, by using the magneto-optical recording medium, recording and reproducing characteristics were measured in a manner similar to Example 1. However, the initialization magnetic field in the perpendicular direction of the medium was changed to 0, 1000, and 2000 Oe and was applied before reproduction. During the reproduction, the reproduction magnetic field in the perpendicular direction of the medium was changed to 0, 200, and 400 Oe and was applied and the characteristics were measured. Table 3 shows results of the measurement.

Comparison 3

A medium similar to the medium disclosed in Japanese Patent Application Laid-Open No. 6-124500 was manufactured in the following method and was evaluated.

By film forming apparatus and method similar to those in Example 1, an SiN interference layer having a thickness of 90 nm, a GdFeCo reproduction layer having a thickness of 40 nm, a TbFeCo memory layer having a thickness of 40 nm, and an SiN protective layer having a thickness of 70 nm were sequentially formed as films on the glass substrate, thereby obtaining a magneto-optical recording medium of Comparison 3. As shown in Table 1, the composition of the GdFeCo reproduction layer was set in a manner such that it becomes RE rich at room temperature and Ms is equal to 180 emu/cc and the compensation temperature is equal to 240° C. and the Curie temperature is equal to or higher than 300° C. The composition of the TbFeCo memory layer was set in a manner such that it becomes TM rich at room temperature and Ms is equal to -150 emu/cc and the Curie temperature is equal to 250° C.

Subsequently, by using the magneto-optical recording medium, recording and reproducing characteristics were measured in a manner similar to Example 1. Table 3 shows results of the measurement.

Comparison 4

By film forming apparatus and method similar to those of Example 1, an SiN interference layer having a thickness of 90 nm, a GdFeCo reproduction layer having a thickness of 40 nm, a GdFe intermediate layer having a thickness of 10 nm, a TbFeCo memory layer having a thickness of 30 nm, and an SiN protective layer having a thickness of 70 nm were sequentially formed as films on the polycarbonate substrate, thereby obtaining a magneto-optical recording medium of Comparison 4. As shown in Table 1, the composition of the GdFeCo reproduction layer was set in a manner such that it becomes RE rich at room temperature and Ms is equal to 240 emu/cc and the compensation temperature is equal to 245° C. and the Curie temperature is equal to or higher than 300° C. The composition of the GdFe intermediate layer was set in a manner such that it becomes RE rich at room temperature and Ms is equal to 420 emu/cc and the Curie temperature is equal to 200° C. The composition of the TbFeCo memory layer was set in a manner such that it becomes TM rich at room temperature and Ms is equal to −140 emu/cc and the Curie temperature is equal to 270° C.

Subsequently, by using the magneto-optical recording medium, recording and reproducing characteristics were measured in a manner similar to Example 1. Table 3 shows results of the measurement.

Comparison 5

By film forming apparatus and method similar to those of Example 1, an SiN interference layer having a thickness of 90 nm, a GdFeCo reproduction layer having a thickness of 40 nm, a GdFe intermediate layer having a thickness of 10 nm, a TbFeCo memory layer having a thickness of 30 nm, and an SiN protective layer having a thickness of 70 nm were sequentially formed as films on the polycarbonate substrate, thereby obtaining a magneto-optical recording medium of Comparison 5. As shown in Table 1, the composition of the GdFeCo reproduction layer was set in a manner such that it becomes RE rich at room temperature and Ms is equal to 240 emu/cc and the compensation temperature is equal to 245° C. and the Curie temperature is equal to or higher than 300° C. The composition of the GdFe intermediate layer was set in a manner such that it becomes RE rich at room temperature and Ms is equal to 540 emu/cc and the Curie temperature is equal to 165° C. The composition of the TbFeCo memory layer was set in a manner such that it becomes TM rich at room temperature and Ms is equal to 140 emu/cc and the Curie temperature is equal to 270° C.

Subsequently, by using the magneto-optical recording medium, recording and reproducing characteristics were measured in a manner similar to Example 1. Table 3 shows results of the measurement.

Evaluation

Among the measured results of Examples 1 to 8, when examining, particularly, the measured results at short mark lengths, in any one of the media, a C/N ratio of 42 dB or higher of the mark length of 0.4 μm and a C/N ratio of −30 dB or less at crosstalks of 0.78 μm were obtained even if the reproduction magnetic field had not be applied. The levels which can be practically used could be obtained.

In the medium of Comparison 1, unless the reproduction magnetic field of 400 Oe was applied, a sufficient C/N ratio could not be obtained. The crosstalks were poor. In the medium of Comparison 2, unless a sufficient initialization magnetic field and reproduction magnetic field were applied, the C/N ratio and the crosstalks could not be improved. In Comparison 3, an enough C/N ratio could not be obtained.

In Comparison 4, since Ms at room temperature is similar to that in Example 2, although the C/N ratio and the crosstalks are at the practical-use levels, since the rare earth sub-lattice magnetization dominant composition is used as an intermediate layer, the Curie temperature is high. Therefore, the reproducing power at which a C/N ratio of 40 dB or more is obtained is suppressed to a low value of 2.1 mW in Example 2. On the other hand, such a reproducing power is set to a high value of 3.1 mW in Comparison 4.

In Comparison 5, although Ms at room temperature has been increased to raise a masking effect at room temperature by using the rare earth sub-lattice magnetization dominant composition as an intermediate layer, the Curie temperature consequently decreased and the magnetization of the intermediate layer disappeared at a temperature lower than the temperature at which the magnetization of the memory layer is transferred. Thus, the reproduction layer is not exchange coupled but is magnetostatically coupled to the recording magnetic domain of the memory layer and a super-high resolution phenomenon occurs. Although a C/N ratio of 42 dB or higher is obtained, as compared with the exchange coupling, since the coupling force is weak, the medium is easily influenced by the external magnetic field. Namely, in the reproducing power at which the highest C/N ratio is obtained, when the reproduction magnetic field was changed and the C/N ratio was measured. Thus, in Example 2, the reproduction can be stably performed in a range from −300 to +300 (Oe) and a C/N ratio=40 dB or higher was obtained. According to Comparison 5, however, a C/N ratio of 40 dB or higher was obtained in only a narrow region in a range from −50 to +100 (Oe) (in this instance, "−" of the reproduction magnetic field is the same as the recording direction of the memory layer).

From the above results, in the magneto-optical recording medium of the invention, the C/N ratio or both of the C/N ratio and the crosstalks can be improved without applying the reproduction magnetic field or both of the initialization magnetic field and the reproduction magnetic field. The linear recording density or both of the linear recording density and the track density can be improved. Since the memory layer and the reproduction layer are exchange coupled upon reproduction, it is hardly influenced by the external magnetic field and the reproduction can be stably performed.

TABLE 1

Examples 1 to 8, Comparisons 1, 3 to 5

| | Reproduction layer | | | | | Intermediate layer | | | | |
|---|---|---|---|---|---|---|---|---|---|---|
| | Composition at % | Film thickness nm | Ms emu/cc | $T_{comp}$ °C. | $T_c$ °C. | Composition at % | Film thickness nm | Ms emu/cc | $T_{comp}$ °C. | $T_c$ °C. |
| Examples | | | | | | | | | | |
| 1 | Gd28(Fe70Co30)72 | 40 | 240 | 245 | 300< | Gd10(FeCo5) | 10 | −530 | — | 190 |
| 2 | Gd26(Fe70Co30)74 | 40 | 150 | 185 | 300< | Gd12Fe | 10 | −430 | — | 150 |

TABLE 1-continued

Examples 1 to 8, Comparisons 1, 3 to 5

| | | | | | | | | | | |
|---|---|---|---|---|---|---|---|---|---|---|
| 3 | Gd28(Fe70Co30)72 | 30 | 240 | 245 | 300< | Gd10(FeCo5) | 10 | −530 | — | 190 |
| 4 | Gd28(Fe70Co30)72 | 40 | 240 | 245 | 300< | Gd10(FeCo5) | 5 | −530 | — | 190 |
| 5 | Gd29(Fe70Co30)72 | 40 | 280 | 270 | 300< | Gd15(FeCo10) | 10 | −400 | — | 250 |
| 6 | Gd26(Fe70Co30)74 | 40 | 150 | 185 | 300< | Gd15Fe | 10 | −360 | — | 150 |
| 7 | Gd28(Fe70Co30)72 | 40 | 240 | 245 | 300< | Gd8(FeCo5) | 10 | −650 | — | 190 |
| 8 | Gd28(Fe70Co30)72 | 40 | 240 | 245 | 300< | (Gd10(FeCo10))Cr8 | 10 | −450 | — | 195 |
| Comparisons | | | | | | | | | | |
| 1 | Gd20(Fe75Co25)80 | 30 | −180 | — | 300< | Tb18(Fe90Co5A15)82 | 10 | −160 | — | 140 |
| 2 | Shown in Table 2 | | | | | | | | | |
| 3 | Gd27(Fe70Co30)73 | 40 | 180 | 240 | 300< | | | | | |
| 4 | Gd28(Fe70Co30)72 | 40 | 240 | 245 | 300< | Gd37Fe63 | 10 | 420 | — | 200 |
| 5 | Gd28(Fe70Co30)72 | 40 | 240 | 245 | 300< | Gd45Fe55 | 10 | 540 | — | 165 |

| | Memory layer | | | | |
|---|---|---|---|---|---|
| | Composition at % | Film thickness nm | Ms emu/cc | $T_{comp}$ °C. | $T_c$ °C. |
| Examples | | | | | |
| 1 | Tb19(Fe75Co25)81 | 30 | −140 | — | 270 |
| 2 | Tb19(Fe75Co25)81 | 30 | −140 | — | 270 |
| 3 | Tb19(Fe75Co25)81 | 30 | −140 | — | 270 |
| 4 | Tb19(Fe75Co25)81 | 30 | −140 | — | 270 |
| 5 | Tb19(Fe75Co25)81 | 30 | −140 | — | 270 |
| 6 | Tb19(Fe75Co25)81 | 30 | −140 | — | 270 |
| 7 | Tb19(Fe75Co25)81 | 30 | −140 | — | 270 |
| 8 | Tb19(Fe75Co25)81 | 30 | −140 | — | 270 |
| Comparisons | | | | | |
| 1 | Tb18(Fe80Co20)82 | 30 | −150 | — | 250 |
| 2 | Shown in Table 2 | | | | |
| 3 | Tb18(Fe80Co20)82 | 40 | −150 | — | 250 |
| 4 | Tb19(Fe75Co25)81 | 30 | −140 | — | 270 |
| 5 | Tb19(Fe75Co25)81 | 30 | −140 | — | 270 |

TABLE 2

| | Comparison 2 | | | | |
|---|---|---|---|---|---|
| | Composition at % | Film thickness nm | Ms emu/cc | $T_{comp}$ °C. | $T_c$ °C. |
| Comparison 2 | | | | | |
| Reproduction layer | Gd21(Fe75Co25)79 | 30 | −160 | — | 300< |
| Intermediate layer | Tb18(Fe90Co5A15)82 | 10 | −160 | — | 140 |
| Auxiliary layer | Gd22(Fe60Co40)78 | 16 | −160 | — | 280 |
| Memory layer | Tb18(Fe80Co20)82 | 40 | −150 | — | 250 |

TABLE 3

| | Initialization magnetic field Oe | Reproduction magnetic field Oe | Evalulation C/N 0.78 μm dB | 0.40 μm dB | 0.30 μm dB | Cross-talks 0.78 μm dB | Leading of reproducing power |
|---|---|---|---|---|---|---|---|
| Examples | | | | | | | |
| 1 | 0 | 0 | 47 | 45 | 36 | −43 | 2.9 |
| 2 | 0 | 0 | 49 | 46 | 37 | −40 | 2.1 |
| 3 | 0 | 0 | 49 | 46 | 37 | −39 | 2.9 |
| 4 | 0 | 0 | 49 | 45 | 35 | −37 | 2.9 |
| 5 | 0 | 0 | 49 | 45 | 36 | −37 | 4.0 |
| 6 | 0 | 0 | 49 | 46 | 36 | −35 | 2.1 |
| 7 | 0 | 0 | 46 | 43 | 33 | −45 | 2.9 |
| 8 | 0 | 0 | 48 | 46 | 37 | −42 | 3.0 |
| Comparisons | | | | | | | |
| 1 | 0 | 0 | 48 | 18 | 5 | −12 | 2.0 |
| | 0 | 200 | 48 | 30 | 18 | −13 | |
| | 0 | 400 | 48 | 45 | 36 | −19 | |
| 2 | 0 | 0 | 48 | 21 | 2 | −15 | 2.0 |
| | 1000 | 400 | 48 | 26 | 8 | −17 | |
| | 2000 | 400 | 48 | 29 | 13 | −19 | |
| | 3000 | 200 | 48 | 30 | 20 | −19 | |
| | 3000 | 400 | 48 | 45 | 34 | −39 | |
| 3 | 0 | 0 | 48 | 35 | 20 | −34 | 3.0 |
| 4 | 0 | 0 | 48 | 45 | 34 | −37 | 3.1 |
| 5 | 0 | 0 | 48 | 42 | 34 | −41 | 3.8 |

What is claimed is:

1. A magneto-optical recording medium comprising:

a reproduction layer which assumes an in-plane magnetization state at room temperature and becomes a perpendicular magnetization film at a temperature between room temperature and a Curie temperature;

a recording layer for storing information; and an intermediate layer which is arranged between said reproduction layer and said recording layer and in which a Curie temperature is lower than those of said reproduction layer and said recording layer and which is iron group element sub-lattice magnetization dominant, wherein each of said layers is constructed by a rare earth-iron group element amorphous alloy and said intermediate layer is made of a material, as a main component, which satisfies $Gd_x(Fe_{100-y}Co_y)_{100-x}$ $8 \leq x \leq 15$, $0 \leq y \leq 50$.

2. A medium according to claim 1, wherein said reproduction layer has a compensation temperature between room temperature and the Curie temperature.

* * * * *

UNITED STATES PATENT AND TRADEMARK OFFICE
CERTIFICATE OF CORRECTION

PATENT NO. : 5,879,822
DATED : March 9, 1999
INVENTOR(S) : Takeshi Okada

It is certified that error appears in the above-indentified patent and that said Letters Patent is hereby corrected as shown below:

COLUMN 1:

Line 56, "cross sec-" should read --cross-sec---.

COLUMN 4:

Line 26, "$0 \leq y \leq 50.$" should read --$0 \leq y \leq 50$,--, and
Line 61, "cross sectional" should read --cross-sectional--.

COLUMN 5:

Line 4, "cross sectional" should read --cross-sectional--.
Line 55, "cross sectional" should read --cross-sectional--.

COLUMN 11:

Line 10, "cross sectional" should read --cross-sectional--.
Line 38, "(1)." should read --(1),--.

Signed and Sealed this

Thirtieth Day of November, 1999

Attest:

Attesting Officer

Q. TODD DICKINSON
Acting Commissioner of Patents and Trademarks